(12) United States Patent
Harada et al.

(10) Patent No.: US 10,803,829 B2
(45) Date of Patent: Oct. 13, 2020

(54) DISPLAY DEVICE AND DISPLAY MODULE

(71) Applicant: Japan Display Inc., Tokyo (JP)

(72) Inventors: Tsutomu Harada, Tokyo (JP);
Kazuhiko Sako, Tokyo (JP)

(73) Assignee: Japan Display Inc., Tokyo (JP)

( * ) Notice: Subject to any disclaimer, the term of this patent is extended or adjusted under 35 U.S.C. 154(b) by 141 days.

(21) Appl. No.: 15/951,783

(22) Filed: Apr. 12, 2018

(65) Prior Publication Data
US 2018/0301116 A1 Oct. 18, 2018

(30) Foreign Application Priority Data

Apr. 14, 2017 (JP) .................................. 2017-080594

(51) Int. Cl.
*G09G 5/10* (2006.01)
*G09G 3/34* (2006.01)
*G09G 3/20* (2006.01)
*F21V 8/00* (2006.01)
*G09G 5/06* (2006.01)

(52) U.S. Cl.
CPC ............. *G09G 5/10* (2013.01); *G02B 6/0068* (2013.01); *G09G 3/2003* (2013.01); *G09G 3/3413* (2013.01); *G09G 3/3426* (2013.01); *G09G 5/06* (2013.01); *G09G 2320/0285* (2013.01); *G09G 2320/0666* (2013.01); *G09G 2320/0673* (2013.01); *G09G 2340/16* (2013.01)

(58) Field of Classification Search
CPC ............................... G09G 5/10; G09G 3/2003
See application file for complete search history.

(56) References Cited

U.S. PATENT DOCUMENTS

| 7,859,499 | B2* | 12/2010 | Furukawa | ................ | G09G 5/02 |
| | | | | | 345/88 |
| 8,390,656 | B2* | 3/2013 | Muroi | .................. | G09G 3/3426 |
| | | | | | 345/690 |
| 9,076,397 | B2* | 7/2015 | Shiobara | .............. | G09G 3/3413 |
| 9,123,280 | B2* | 9/2015 | Tanaka | ................... | G09G 3/003 |

(Continued)

FOREIGN PATENT DOCUMENTS

| JP | 2013-076842 A | 4/2013 |
| JP | 2015-82023 A | 4/2015 |

*Primary Examiner* — Nitin Patel
*Assistant Examiner* — Robert M Stone
(74) *Attorney, Agent, or Firm* — K&L Gates LLP

(57) ABSTRACT

A display device includes: a first controller that outputs an output image signal having the same resolution as that of pixels to an image display panel; and a second controller that transmits an input image signal to the first controller, generates second luminance distribution data divided into regions at a second density lower than a first density equal to the resolution, and transmits the second luminance distribution data to the first controller. The second controller generates first luminance distribution data divided into regions at a third density lower than the second density, controls an illuminator based on the first luminance distribution data, and generates the second luminance distribution data by applying a polynomial interpolation to the first luminance distribution data. The first controller generates third luminance distribution data having the resolution, and generates the output image signal by adjusting the input image signal based on the third luminance distribution data.

23 Claims, 19 Drawing Sheets

(56) References Cited

U.S. PATENT DOCUMENTS

| | | | | |
|---|---|---|---|---|
| 9,318,058 B2* | 4/2016 | Furukawa | | G09G 3/342 |
| 10,121,420 B2* | 11/2018 | Kato | | G09G 3/342 |
| 2009/0002400 A1* | 1/2009 | Ha | | G09G 5/10 |
| | | | | 345/690 |
| 2009/0322800 A1* | 12/2009 | Atkins | | G09G 3/3413 |
| | | | | 345/690 |
| 2010/0013872 A1* | 1/2010 | Masuda | | G09G 3/3413 |
| | | | | 345/691 |
| 2011/0090265 A1* | 4/2011 | Muroi | | G09G 3/3426 |
| | | | | 345/690 |
| 2011/0115827 A1* | 5/2011 | Tanaka | | G09G 3/3426 |
| | | | | 345/690 |
| 2011/0141077 A1* | 6/2011 | Cho | | G09G 3/3426 |
| | | | | 345/207 |
| 2011/0181633 A1* | 7/2011 | Higashi | | G09G 3/2003 |
| | | | | 345/691 |
| 2012/0069063 A1* | 3/2012 | Sato | | H04N 13/31 |
| | | | | 345/690 |
| 2012/0139974 A1* | 6/2012 | Sakai | | G09G 3/3426 |
| | | | | 345/690 |
| 2012/0147067 A1* | 6/2012 | Hashimoto | | G09G 3/3611 |
| | | | | 345/690 |
| 2012/0154459 A1* | 6/2012 | Otoi | | G09G 3/3426 |
| | | | | 345/690 |
| 2012/0176419 A1* | 7/2012 | Otoi | | H04N 5/57 |
| | | | | 345/690 |
| 2012/0320105 A1* | 12/2012 | Ueno | | G09G 3/3426 |
| | | | | 345/690 |
| 2013/0100178 A1* | 4/2013 | Ninan | | H04N 19/44 |
| | | | | 345/690 |
| 2015/0109351 A1 | 4/2015 | Harada et al. | | |
| 2015/0109352 A1* | 4/2015 | Takasaki | | G09G 3/3406 |
| | | | | 345/690 |
| 2015/0279285 A1* | 10/2015 | Sako | | G09G 3/3607 |
| | | | | 345/694 |
| 2015/0279286 A1* | 10/2015 | Harada | | G09G 3/3413 |
| | | | | 345/690 |
| 2015/0317934 A1* | 11/2015 | Takasaki | | G09G 3/3426 |
| | | | | 345/690 |
| 2016/0358558 A1* | 12/2016 | Takasaki | | G09G 3/342 |
| 2017/0336676 A1* | 11/2017 | Harada | | G02F 1/133602 |

* cited by examiner

FIG.9

| | X → | | | | | | | | | |
|---|---|---|---|---|---|---|---|---|---|---|
| ↓Y LUTC | | | | | | | | | | |
| 5 | 20 | 40 | 20 | 5 | 3 | 1 | ... | 0 | 0 | 0 |
| 5 | 15 | 35 | 15 | 5 | 3 | 2 | ... | 0 | 0 | 0 |
| 4 | 13 | 25 | 13 | 4 | 3 | 2 | ... | 0 | 0 | 0 |
| 4 | 12 | 20 | 12 | 4 | 3 | 1 | ... | 0 | 0 | 0 |
| 3 | 8 | 12 | 8 | 3 | 3 | 1 | ... | 0 | 0 | 0 |
| 2 | 6 | 10 | 6 | 2 | 2 | 1 | ... | 0 | 0 | 0 |
| ⋮ | ⋮ | ⋮ | ⋮ | ⋮ | ⋮ | ⋮ | | ⋮ | ⋮ | ⋮ |
| 2 | 6 | 10 | 6 | 2 | 2 | 1 | ... | 0 | 0 | 0 |
| 2 | 6 | 10 | 6 | 2 | 2 | 1 | ... | 0 | 0 | 0 |

POLYNOMIAL
INTERPOLATION

LINEAR
INTERPOLATION

DISPLAY DEVICE AND DISPLAY MODULE

CROSS-REFERENCE TO RELATED APPLICATIONS

This application claims priority from Japanese Application No. 2017-080594, filed on Apr. 14, 2017, the contents of which are incorporated by reference herein in its entirety.

BACKGROUND

1. Technical Field

The present invention relates to a display device and a display module.

2. Description of the Related Art

Display devices are known (for example, from Japanese Patent Application Laid-open Publication No. 2013-076842) that employ a local dimming system in which a light source device, such as a backlight, is divided into a plurality of light-emitting regions, and the light emission quantity is controlled for each of the light-emitting regions according to a video signal of a display region corresponding to the light-emitting region.

SUMMARY

According to an aspect, a display device includes: an image display panel comprising a plurality of pixels; an illuminator configured to illuminate the image display panel from a back side thereof; a first controller configured to output an output image signal having the same resolution as that of the pixels to the image display panel; a second controller configured to transmit an input image signal to the first controller, generate, according to luminance distribution information on the input image signal, second luminance distribution data divided into regions at a second planar density lower than a first planar density equal to the resolution, and transmit the second luminance distribution data to the first controller. The second controller is configured to generate first luminance distribution data divided into regions at a third planar density lower than the second planar density according to the luminance distribution information, control the illuminator based on the first luminance distribution data, and generate the second luminance distribution data by applying a polynomial interpolation to the first luminance distribution data to transmit the second luminance distribution data to the first controller. The first controller is configured to generate third luminance distribution data having the resolution by applying a linear interpolation to the second luminance distribution data, and generate the output image signal by adjusting the input image signal based on the third luminance distribution data.

According to another aspect, a display module includes: an image display panel comprising a plurality of pixels; and a controller configured to output an output image signal having the same resolution as the number of the pixels to the image display panel. The controller is configured to receive second luminance distribution data according to luminance distribution information on an input image signal, the second luminance distribution data being divided into regions at a second planar density lower than a first planar density equal to the resolution, generate luminance distribution data having the resolution by applying a linear interpolation to the second luminance distribution data, and generate the output image signal by adjusting the input image signal based on the luminance distribution data.

BRIEF DESCRIPTION OF THE DRAWINGS

FIG. 9 is a diagram explaining one of the look-up tables stored in the display device according to the embodiment;

DETAILED DESCRIPTION

Figure 1:
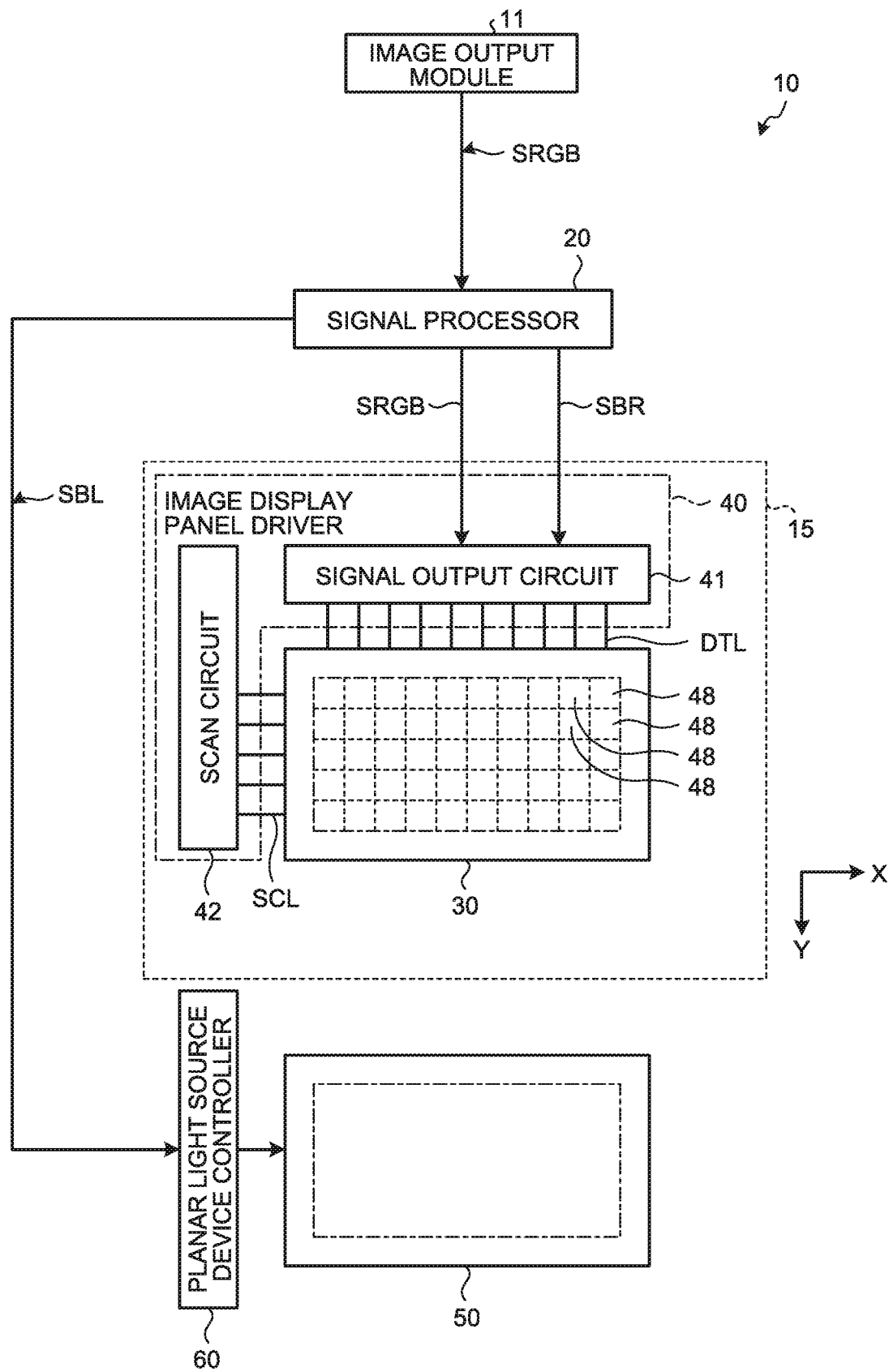
FIG. 1 is a block diagram illustrating an exemplary configuration of a display device according to an embodiment.

The following describes a mode (embodiment) for carrying out the present disclosure in detail with reference to the drawings. The present disclosure is not limited to the description of the embodiment to be given below. Components to be described below include those easily conceivable by those skilled in the art or those substantially identical thereto. Moreover, the components to be described below can be appropriately combined. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Embodiment

1. Configuration of Display Device

Figure 2:
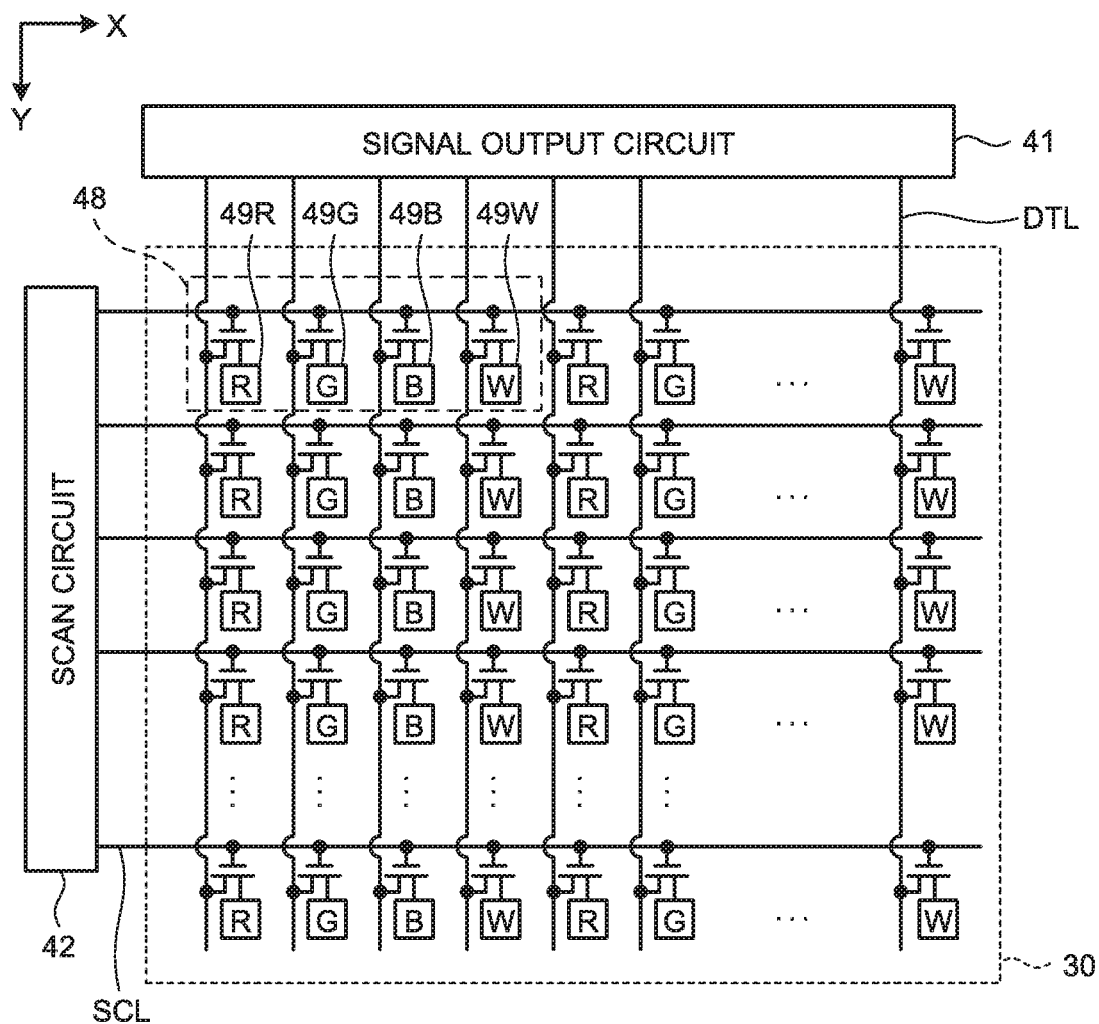
FIG. 2 is a diagram illustrating a pixel array of an image display panel of the display device according to the embodiment.

FIG. 1 is a block diagram illustrating an exemplary configuration of a display device according to an embodiment of the present invention. FIG. 2 is a diagram illustrating a pixel array of an image display panel of the display device according to the embodiment.

As illustrated in FIG. 1, this display device 10 includes an image output module 11, a signal processor 20, a display module 15, a planar light source device 50 that illuminates an image display panel 30 from the back side thereof, and a planar light source device controller 60 that controls driving of the planar light source device 50. Examples of the signal processor 20 include a host central processing unit (CPU), but are not limited thereto. The signal processor 20 corresponds to an example of a second controller of the present disclosure.

The display module 15 includes the image display panel 30 that displays an image and an image display panel driver 40 that controls driving of the image display panel 30. The image display panel driver 40 includes a signal output circuit 41 and a scan circuit 42. The display module 15 may include the planar light source device 50 and the planar light source device controller 60.

The image output module 11 outputs an input image signal SRGB to the signal processor 20. The input image signal SRGB includes signals for displaying a first color (red, for example), a second color (green, for example), and a third color (blue, for example). Examples of the image output module 11 include an application processor, but are not limited thereto.

The signal processor 20 outputs the input image signal SRGB to the signal output circuit 41. The signal processor 20 also generates second luminance distribution data SBR representing a luminance distribution of a backlight according to luminance distribution information on the input image signal SRGB, and outputs the second luminance distribution data SBR to the signal output circuit 41. In addition, the signal processor 20 generates a planar light source device control signal SBL according to the luminance distribution information on the input image signal SRGB, and outputs the planar light source device control signal SBL to the planar light source device controller 60. The signal processor 20 performs image analysis on the luminance distribution information on the input image signal SRGB after being downscaled, and determines the luminance of each light source in the backlight. Based on the luminance of each of the light sources in the backlight, the signal processor 20 generates first luminance distribution data representing the luminance distribution of the backlight divided into regions at a planar density lower than the resolution of the image display panel 30. Furthermore, the signal processor 20 applies a polynomial interpolation to the first luminance distribution data to generate the second luminance distribution data SBR representing the luminance distribution of the backlight, and transmits the second luminance distribution data SBR to the signal output circuit 41. The signal output circuit 41 applies a liner interpolation to the second luminance distribution data SBR to generate third luminance distribution data representing the luminance distribution of the backlight having the resolution of the image display panel 30. The signal output circuit 41 adjusts the input image signal SRGB based on the third luminance distribution data to generate an output image signal. The resolution of the third luminance distribution data is higher than that of the second luminance distribution data, which, in turn, is higher than that of the first luminance distribution data. With this configuration, the display device 10 can reduce the processing load of the signal processor 20. The display device 10 can also reduce the communication load between the signal processor 20 and the signal output circuit 41. In addition, to adjust the algorithm or parameters of the creation of the second luminance distribution data SBR, or to adjust the algorithm or parameters of the polynomial interpolation, the display device 10 only needs to be changed in software for implementing the signal processor 20, and need not be changed in the circuit of the signal output circuit 41. In the display device 10, the signal processor 20 generates the second luminance distribution data SBR divided into regions at a planar density lower than the resolution of the image display panel 30, and transmits the second luminance distribution data SBR to the signal output circuit 41. As a result, the display device 10 can reduce the circuit scale of the signal output circuit 41. The display device 10 can also simplify upscaling of the second luminance distribution data SBR in the signal output circuit 41 by appropriately setting the planar density of the second luminance distribution data SBR. In addition, any change in configuration of the planar light source device 50 of the display device 10 can be dealt with by only changing the software for implementing the signal processor 20, thus eliminating the need for change in the circuit of the signal output circuit 41.

Pixels 48 are arranged in a two-dimensional matrix (row-column configuration) of $P_0 \times Q_0$ pixels ($P_0$ pixels in the row direction and $Q_0$ pixels in the column direction) in the image display panel 30. The example illustrated in FIG. 1 represents an example in which the pixels 48 are arranged in a matrix in a two-dimensional XY coordinate system. In this example, the row direction corresponds to the X-direction, and the column direction corresponds to the Y-direction. In the embodiment, $P_0=3840$, and $Q_0=2160$.

Since the number of the pixels 48 is $P_0 \times Q_0$, the number of elements (number of pixels) of the input image signal SRGB is $P_0 \times Q_0$. The number of elements of the second luminance distribution data SBR is $M \times N$. In the embodiment, $M<P_0$ and $N<Q_0$ are satisfied. In the embodiment, $M=320$, and $N=180$. That is, the planar density of the second luminance distribution data SBR is lower than the resolution of the input image signal SRGB.

To display an image on the image display panel 30, the signal output circuit 41 needs the luminance distribution data on a per pixel 48 basis. That is, the signal output circuit 41 needs third luminance distribution data SB having the number of elements of $P_0 \times Q_0$. Thus, the signal processor 20 might be configured to generate the third luminance distribution data SB having the number of elements of $P_0 \times Q_0$, and transmit it to the signal output circuit 41. If, however, the signal processor 20 generates the third luminance distribution data SB having the number of elements of $P_0 \times Q_0$, the signal processor 20 bears a large processing load when the signal processor 20 is implemented by the host CPU and the software. The communication load also increases to transmit the third luminance distribution data SB having the number of elements of $P_0 \times Q_0$ between the signal processor 20 and the signal output circuit 41.

Alternatively, the signal processor 20 might be configured not to generate the luminance distribution data, and the signal output circuit 41 might be configured to generate the third luminance distribution data SB having the number of elements of $P_0 \times Q_0$ based on the input image signal SRGB. If, however, the signal output circuit 41 generates the third luminance distribution data SB having the number of elements of $P_0 \times Q_0$, the signal output circuit 41 needs to be changed in the circuit to adjust the algorithm or parameters of the creation of the third luminance distribution data SB.

The processing of generating the second luminance distribution data SBR having the number of elements of M×N is processing of repeating relatively complicated calculations a relatively small number of times (such as roughly M×N times), and is suitable for software implementation. The processing of generating the third luminance distribution data SB having the number of elements of $P_0 \times Q_0$ by upscaling the second luminance distribution data SBR having the number of elements of M×N is processing of repeating relatively simple calculations a relatively large number of times (such as roughly $P_0 \times Q_0$ times), and is suitable for hardware implementation, while requiring a large processing load for software implementation.

Therefore, in the display device 10, the signal processor 20 is configured to generate the second luminance distribution data SBR having the number of elements of M×N, and transmits it to the signal output circuit 41. In addition, the signal output circuit 41 is configured to generate the third luminance distribution data SB having the number of elements of $P_0 \times Q_0$ by upscaling the second luminance distribution data SBR having the number of elements of M×N. As a result, the display device 10 can reduce the processing load of the signal processor 20. The display device 10 can also reduce the communication load. In addition, to adjust the algorithm or the parameters of the creation of the second luminance distribution data SBR, the display device 10 only needs to be changed in the software for implementing the signal processor 20, and need not be changed in the circuit of the signal output circuit 41.

Referring to FIG. 2, each of the pixels 48 includes a first sub-pixel 49R, a second sub-pixel 49G, a third sub-pixel 49B, and a fourth sub-pixel 49W. The first sub-pixel 49R displays a first primary color (red, for example). The second sub-pixel 49G displays a second primary color (green, for example). The third sub-pixel 49B displays a third primary color (blue, for example). The fourth sub-pixel 49W displays a fourth color (specifically, white).

In this manner, each of the pixels 48 arranged in a matrix (row-column configuration) in the image display panel 30 includes the first sub-pixel 49R for displaying the first color, the second sub-pixel 49G for displaying the second color, the third sub-pixel 49B for displaying the third color, and the fourth sub-pixel 49W for displaying the fourth color. The first color, the second color, the third color, and the fourth color are not limited to the first primary color, the second primary color, the third primary color, and white, but only need to be different colors from one another, such as complementary colors.

The fourth sub-pixel 49W for displaying the fourth color is preferably brighter than the first sub-pixel 49R for displaying the first color, the second sub-pixel 49G for displaying the second color, and the third sub-pixel 49B for displaying the third color, when the four sub-pixels are irradiated with the same light source lighting amount. In the following, the first sub-pixel 49R, the second sub-pixel 49G, the third sub-pixel 49B, and the fourth sub-pixel 49W will be each called a sub-pixel 49 when need not be distinguished from one another.

The display device 10 is more specifically a transmissive color liquid crystal display device. The image display panel 30 is a color liquid crystal display panel. A first color filter for transmitting the first primary color is disposed between the first sub-pixel 49R and an image viewer. A second color filter for transmitting the second primary color is disposed between the second sub-pixel 49G and the image viewer. A third color filter for transmitting the third primary color is disposed between the third sub-pixel 49B and the image viewer. The image display panel 30 has no color filter between the fourth sub-pixel 49W and the image viewer.

A transparent resin layer instead of the color filter may be disposed on the fourth sub-pixel 49W. When the transparent resin layer is disposed on the fourth sub-pixel 49W, the image display panel 30 can be kept from having a large gap on the fourth sub-pixel 49W, which would be generated by not having the color filter disposed on the fourth sub-pixel 49W.

The signal output circuit 41 is electrically coupled to the image display panel 30 through pixel signal lines DTL. The scan circuit 42 is electrically coupled to the image display panel 30 through scan signal lines SCL. The scan circuit 42 selects the sub-pixel 49 in the image display panel 30, and controls on and off of a switching element (such as a thin-film transistor (TFT)) for controlling operations (light transmittance) of the sub-pixel 49.

The signal output circuit 41 processes the input image signal SRGB to generate an output image signal SRGBW. That is, the signal output circuit 41 converts the input value (input image signal SRGB) in an input HSV (hue-saturation-value, value is also called brightness) color space into the extended value (output image signal SRGBW) in an extended HSV color space extended with the first color, the second color, the third color, and the fourth color to generate the output image signal SRGBW. In addition, the signal output circuit 41 adjusts the luminance of the output image signal SRGBW based on the second luminance distribution data SBR, and outputs the adjusted output image signal SRGBW to the image display panel 30.

Examples of the signal output circuit 41 include a chip on glass (COG) mounted in a bezel region of a glass substrate included in the display module 15, but are not limited thereto. The signal output circuit 41 may be made of elements provided in the bezel region of the glass substrate. The signal output circuit 41 corresponds to an example of a first controller of the present disclosure.

The planar light source device 50 is disposed on the back side of the image display panel 30, and emits light toward the image display panel 30 to illuminate the image display panel 30.

Figure 3:
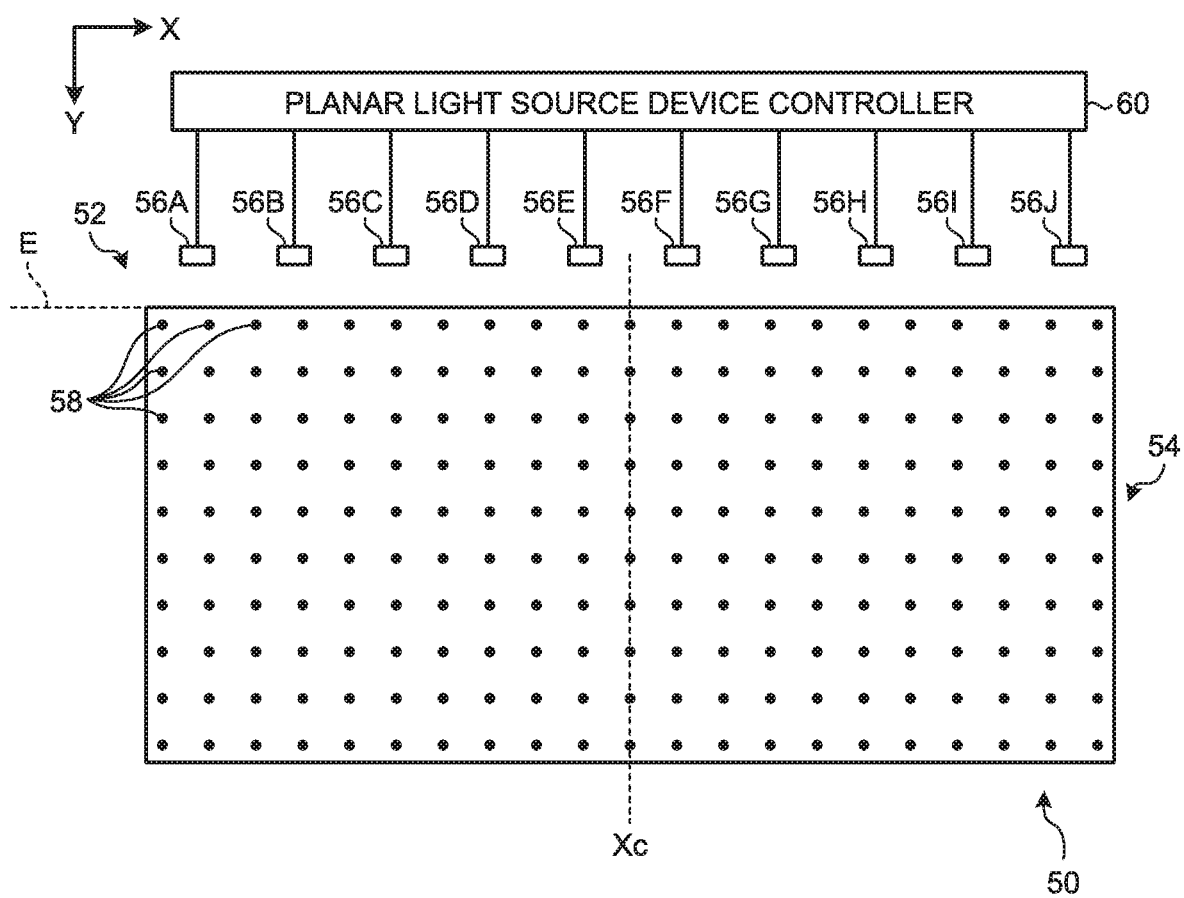
FIG. 3 is an explanatory diagram of a planar light source device of the display device according to the embodiment.

FIG. 3 is an explanatory diagram of the planar light source device of the display device according to the embodiment. The planar light source device 50 includes a light guide plate 54 and a light source 52 in which a plurality of light sources 56A to 56J are arranged at locations opposed to an entrance surface E corresponding to at least one side surface of the light guide plate 54. The arrangement of the light sources is not limited to this arrangement. For example, the light sources may be arranged in a two-dimensional matrix on the back side of the light guide plate 54, and emit the light to the back side of the light guide plate 54.

The light sources 56A to 56J are, for example, light-emitting diodes (LEDs) of the same color (such as white). Each of the light sources 56A to 56J may be one LED or a plurality of LEDs coupled in series or in parallel.

The light sources 56A to 56J are arranged along one side surface of the light guide plate 54. When X denotes the light source arrangement direction in which the light sources 56A to 56J are arranged, the light emitted from the light sources 56A to 56J toward a light-entering direction Y orthogonal to the light source arrangement direction X enters the light guide plate 54 through the entrance surface E.

The planar light source device controller 60 controls, for example, the light quantity of the light emitted from the planar light source device 50. The planar light source device controller 60 controls the light quantity (light intensity) of the light irradiating the image display panel 30 by adjusting the current or the duty cycle supplied to the planar light source device 50 based on the planar light source device control signal SBL output from the signal processor 20. The planar light source device controller 60 can perform split drive control of the light sources to control the light quantity of the light emitted from each of the light sources 56A to 56J by controlling the current or the duty cycle of each of the light sources 56A to 56J.

Figure 4:
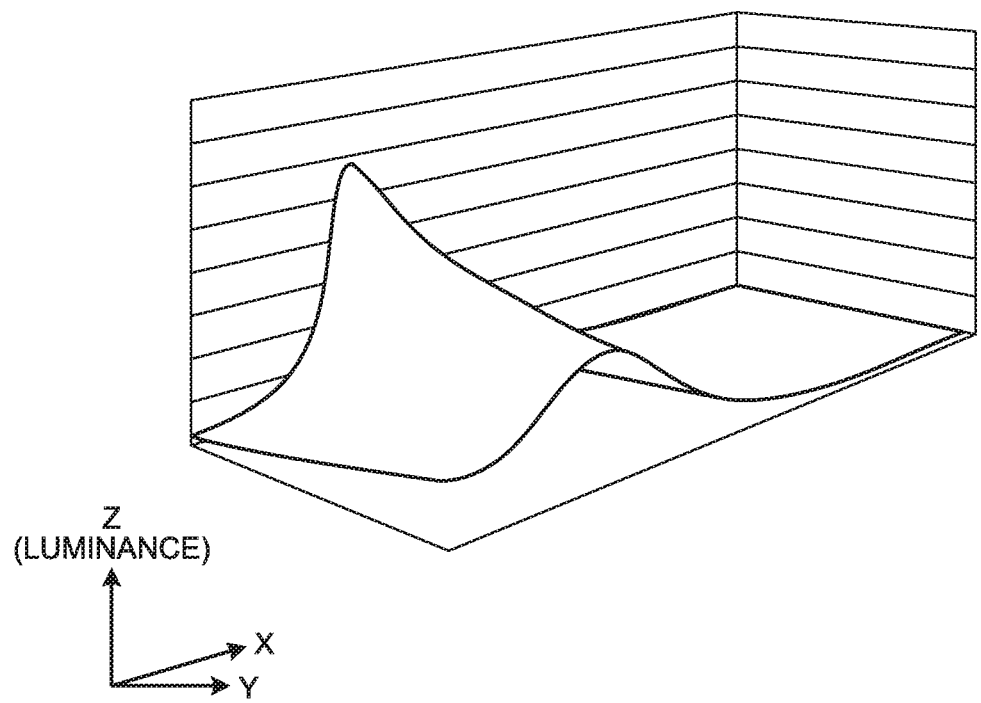
FIG. 4 is an explanatory diagram explaining an exemplary intensity distribution of light from one light source of the display device according to the embodiment.

FIG. 4 is an explanatory diagram explaining an exemplary intensity distribution of the light from one of the light sources of the display device according to the embodiment. FIG. 4 illustrates the information on the light intensity distribution of the light that is emitted from the light source 56C and transmitted to a flat surface of the image display panel 30 from the light guide plate 54 when only the light source 56C illustrated in FIG. 3 is lit up. The incident light from the light source 56C enters the light guide plate 54 through the entrance surface E toward the light-entering direction Y orthogonal to the light source arrangement direction X. Then, the light guide plate 54 transmits the light toward an illuminating direction Z for illuminating the image display panel 30 from the back side thereof. In the embodiment, the illuminating direction Z is orthogonal to the light source arrangement direction X and the light-entering direction Y. Each of the other light sources 56A, 56B, 56D, 56E, 56F, 56G, 56H, 56I, and 56J has the same light intensity distribution as that of the light source 56C. The light intensity distribution of the entire image display panel 30 is obtained by combining the light intensity distributions of the light sources 56A to 56J.

2. Processing Operations of Display Device

Figure 5:
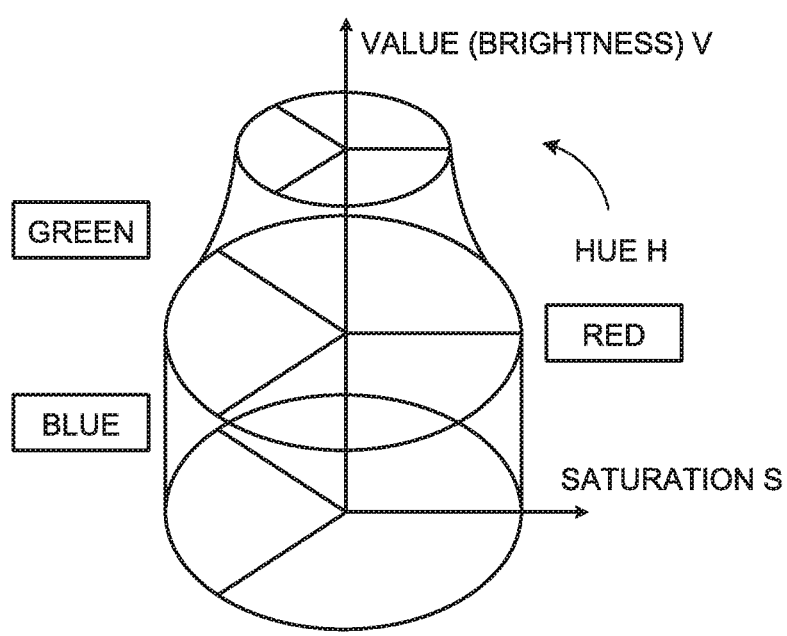
FIG. 5 is a conceptual diagram of an extended HSV (hue-saturation-value, value is also called brightness) color space reproducible by the display device according to the embodiment.
Figure 6:
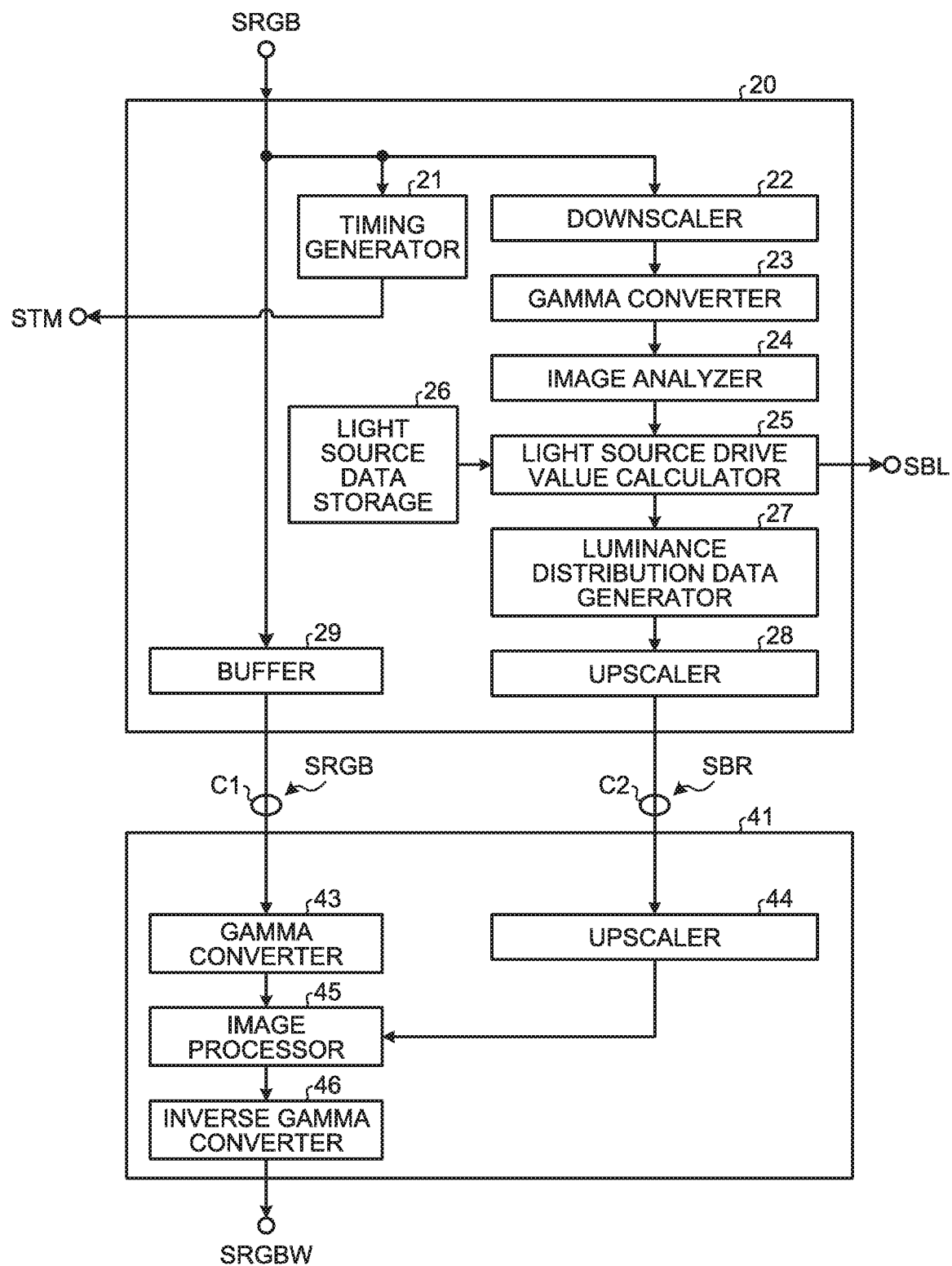
FIG. 6 is a block diagram for explaining a signal processor and a signal output circuit of the display device according to the embodiment.
Figure 7:
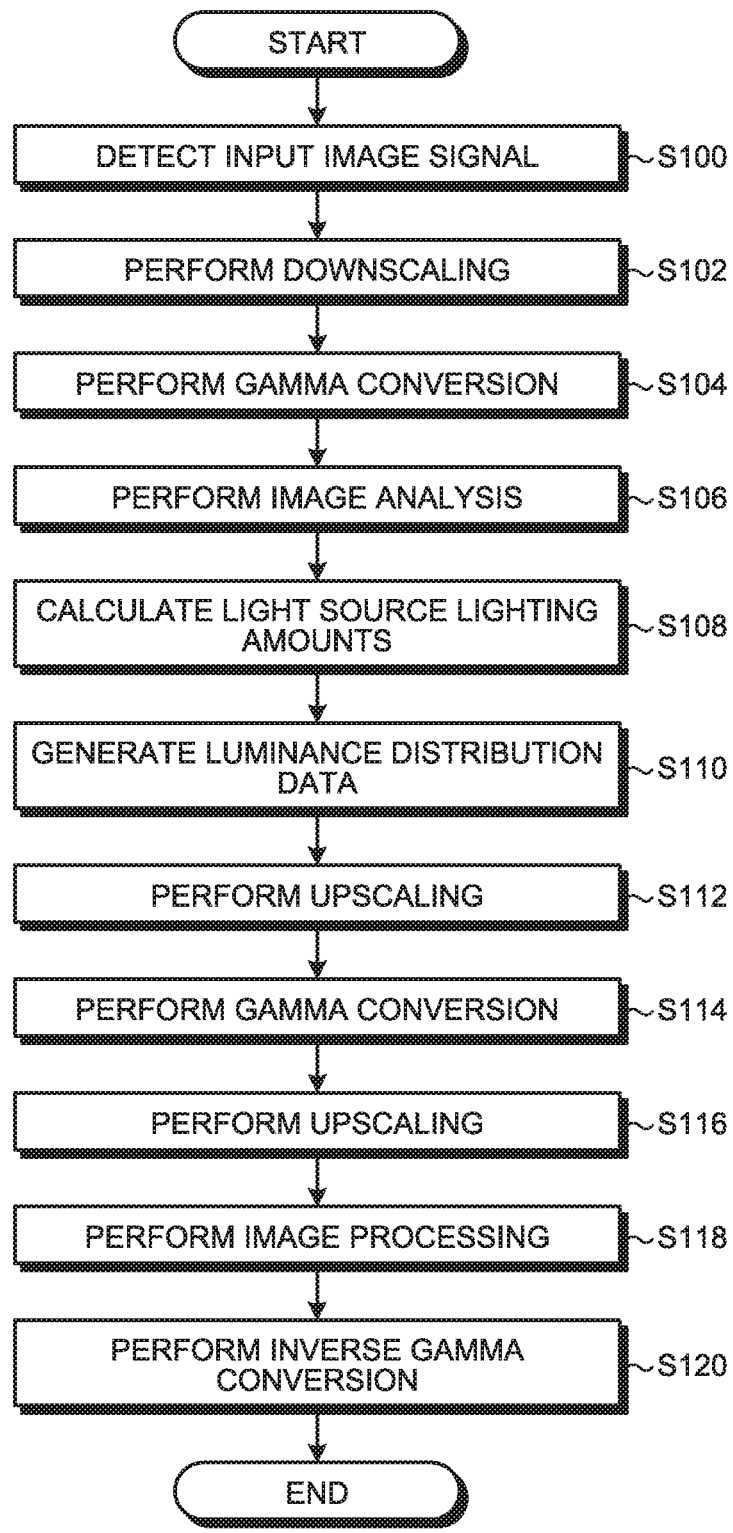
FIG. 7 is a flowchart illustrating operations of the display device according to the embodiment.

FIG. 5 is a conceptual diagram of the extended HSV color space reproducible by the display device according to the embodiment. FIG. 6 is a block diagram for explaining the signal processor and the signal output circuit of the display device according to the embodiment. FIG. 7 is a flowchart illustrating operations of the display device according to the embodiment.

The input image signal SRGB includes, as input signals for the respective pixels, information on images (colors) to be displayed at locations of the respective pixels. Specifically, the signal processor 20 and the signal output circuit 41 receive the input image signal SRGB that includes an input signal for the first sub-pixel 49R having a signal value of $x_{1\_(p,q)}$, an input signal for the second sub-pixel 49G having a signal value of $x_{2\_(p,q)}$, and an input signal for the third sub-pixel 49B having a signal value of $x_{3\_(p,q)}$ with respect to the (p,q)th pixel 48 (where $1 \leq p \leq P_0$ and $1 \leq q \leq Q_0$) in the image display panel 30 in which the $P_0 \times Q_0$ pixels 48 are arranged in a matrix.

Referring to FIG. 6, the signal processor 20 includes a timing generator 21, a downscaler 22, a gamma converter 23, an image analyzer 24, a light source drive value calculator 25, a light source data storage 26, a luminance distribution data generator 27, an upscaler 28, and a buffer 29. The buffer 29 temporarily stores the input image signal SRGB and transmits it to the signal output circuit 41. The signal processor 20 performs the image analysis on the luminance distribution information on the input image signal SRGB after being downscaled, and determines the luminance of each of the light sources in the backlight. Based on the luminance of each of the light sources in the backlight, the signal processor 20 generates the first luminance distribution data representing the luminance distribution of the backlight divided into regions at the planar density lower than the resolution of the image display panel 30. Furthermore, the signal processor 20 applies the polynomial interpolation to the first luminance distribution data to generate the second luminance distribution data SBR representing the luminance distribution of the backlight, and transmits the second luminance distribution data SBR to the signal output circuit 41. The signal output circuit 41 includes a gamma converter 43, an upscaler 44, an image processor 45, and an inverse gamma converter 46. The signal output circuit 41 applies the liner interpolation to the second luminance distribution data SBR to generate the third luminance distribution data representing the luminance distribution of the backlight having the resolution of the image display panel 30. The signal output circuit 41 adjusts the input image signal SRGB based on the third luminance distribution data to generate the output image signal SRGBW.

The signal processor 20 is coupled to the signal output circuit 41 through communication paths C1 and C2. The signal processor 20 transmits the input image signal SRGB to the signal output circuit 41 through the communication path C1. The signal processor 20 transmits the second luminance distribution data SBR to the signal output circuit 41 through the communication path C2. Examples of each of the communication paths C1 and C2 include one or more wires.

If the signal processor 20 has output ports through which output can be made to two screens, two such communication paths C1 are needed for the two screens, and two such communication paths C2 are needed for the two screens.

The host CPU executes a program to implement the timing generator 21, the downscaler 22, the gamma converter 23, the image analyzer 24, the light source drive value calculator 25, the luminance distribution data generator 27, and the upscaler 28. The present disclosure is, however, not limited to this configuration. For example, if a server provided across a network generates a video, the server may execute a program for the operations up to the upscaler 28. Alternatively, a hardware circuit may implement the timing generator 21, the downscaler 22, the gamma converter 23, the image analyzer 24, the light source drive value calculator 25, the luminance distribution data generator 27, and the upscaler 28. A hardware circuit implements the gamma converter 43, the upscaler 44, the image processor 45, and the inverse gamma converter 46. The present disclosure is, however, not limited to this configuration.

Referring to FIG. 7, the timing generator 21 detects the input image signal SRGB at Step S100. The timing generator 21 processes the input image signal SRGB to output a synchronizing signal STM for each frame to the image display panel driver 40 and the planar light source device controller 60. The synchronizing signal STM synchronizes the operation timing of the image display panel driver 40 with that of the planar light source device controller 60. The synchronizing signal STM may include a vertical synchronizing signal and a horizontal synchronizing signal.

At Step S102, the downscaler 22 performs downscaling to generate a downscaled input image signal DSRGB obtained by reducing the number of elements (number of pixels) of the input image signal SRGB. The number of elements (number of pixels) of the downscaled input image signal DSRGB is I×J, where I<M, and J<N. In the embodiment, I=32, and J=18. That is, the resolution of the downscaled input image signal DSRGB is lower than the planar density of the second luminance distribution data SBR.

The downscaler 22 may generate the downscaled input image signal DSRGB by thinning the input image signal SRGB. The downscaler 22 may alternatively generate the downscaled input image signal DSRGB by dividing the input image signal SRGB into I×J regions, and extracting a representative value of each of the I×J regions.

The (i,j)th element (pixel) (where 1≤i≤I and 1≤j≤J) of the downscaled input image signal DSRGB includes a signal of the first color having a signal value of $dx_{1\_(i,j)}$, a signal of the second color having a signal value of $dx_{2\_(i,j)}$, and a signal of the third color having a signal value of $dx_{3\_(i,j)}$. The display device 10 can reduce the processing load for generating the second luminance distribution data SBR by downscaling the input image signal SRGB.

At Step S104, the gamma converter 23 performs gamma conversion on the downscaled input image signal DSRGB.

At Step S106, the image analyzer 24 performs the image analysis on the downscaled input image signal DSRGB after being subjected to the gamma conversion. The following describes the execution step (Step S106) of the image analysis according to the embodiment in detail.

The display device 10 includes the fourth sub-pixel 49W for outputting the fourth color (white) in the pixel 48, and can thereby widen the dynamic range of the value (also called brightness) in the HSV color space (extended HSV color space), as illustrated in FIG. 5. That is, as illustrated in FIG. 5, the extended HSV color space has a shape obtained by placing a substantially truncated cone body in which the maximum value of brightness V decreases with increase in saturation S on the cylindrical input HSV color space representable by the first sub-pixel 49R, the second sub-pixel 49G, and the third sub-pixel 49B.

At Step S106, the image analyzer 24 analyzes the image data after being processed at Step S104 to obtain luminance required for each of the downscaled pixels. At Step S108, the light source drive value calculator 25 calculates representative luminance T(k,l) (where 1≤k≤K and 1≤l≤L) such that the luminance of the planar light source device 50 equals the luminance required for each of the pixels, and individually independently controls the current or the duty cycle of each of the light sources 56A to 56J. At Step S110, the luminance distribution data generator 27 generates first luminance distribution data DSBR having the representative luminance T(k,l) (where 1≤k≤K and 1≤l≤L) calculated at Step S108 as elements thereof. At Step S112, the upscaler 28 performs the upscaling to generate the second luminance distribution data SBR by increasing the number of elements (K×L) of the first luminance distribution data DSBR, and transmits the generated second luminance distribution data SBR to the signal output circuit 41.

The present disclosure is applicable to a case of determining the luminance of the planar light source device 50 when the above-described processing is applied to the display device using the fourth color (white) in addition to the first color (red), the second color (green), and the third color (blue). As an example, the signal processor 20 stores therein maximum values Vmax(S) of the brightness using the saturation S as a variable in the extended HSV color space extended by the addition of the fourth color (white). That is, the signal processor 20 stores therein the maximum value Vmax(S) of the brightness for each pair of coordinates (values) of the saturation S and a hue H regarding the three-dimensional shape of the HSV color space illustrated in FIG. 5. Since the input image signal SRGB includes the input signals for the first sub-pixel 49R, the second sub-pixel 49G, and the third sub-pixel 49B, the input HSV color space of the input image signal has a cylindrical shape, that is, the same shape as a cylindrical part of the extended HSV color space.

Then, the image analyzer 24 calculates an output signal of the first color (signal value $DX_{1\_(i,j)}$) at least based on an input signal of the first color (signal value $dx_{1\_(i,j)}$) and an extension coefficient α. The image analyzer 24 calculates an output signal of the second color (signal value $DX_{2\_(i,j)}$) at least based on an input signal of the second color (signal value $dx_{2\_(i,j)}$) and the extension coefficient α. The image analyzer 24 calculates an output signal of the third color (signal value $DX_{3\_(i,j)}$) at least based on an input signal of the third color (signal value $dx_{3\_(i,j)}$) and the extension coefficient α. In addition, the image analyzer 24 calculates an output signal of the fourth color (signal value $DX_{4\_(i,j)}$) based on the input signal of the first color (signal value $dx_{1\_(i,j)}$), the input signal of the second color (signal value $dx_{2\_(i,j)}$), and the input signal of the third color (signal value $dx_{3\_(i,j)}$).

Specifically, the image analyzer 24 calculates the output signal of the first color based on the extension coefficient α of the first color and the output signal of the fourth color. The image analyzer 24 calculates the output signal of the second color based on the extension coefficient α of the second color and the output signal of the fourth color. The image analyzer 24 calculates the output signal of the third color based on the extension coefficient α of the third color and the output signal of the fourth color.

That is, when χ denotes a constant depending on the display device 10, the image analyzer 24 uses Expressions (1) to (3) given below to obtain the signal value $DX_{1\_(i,j)}$ serving as the output signal of the first color, the signal value $DX_{2\_(i,j)}$ serving as the output signal of the second color, and the signal value $DX_{3\_(i,j)}$ serving as the output signal of the third color for the (i,j)th element (pixel) (where 1≤i≤I and 1≤j≤J) of the downscaled input image signal DSRGB.

$$DX_{1\_(i,j)} = \alpha \cdot dx_{1\_(i,j)} - \chi \cdot DX_{4\_(i,j)} \quad (1)$$

$$DX_{2\_(i,j)} = \alpha \cdot dx_{2\_(i,j)} - \chi \cdot DX_{4\_(i,j)} \quad (2)$$

$$DX_{3\_(i,j)} = \alpha \cdot dx_{3\_(i,j)} - \chi \cdot DX_{4\_(i,j)} \quad (3)$$

The image analyzer 24 obtains the maximum value Vmax (S) of the brightness using the saturation S as a variable in the extended HSV color space extended by the addition of the fourth color. The image analyzer 24 obtains the saturation S and the brightness V(S) in the (i,j)th element (pixel) based on the input signal values in the (i,j)th element (pixel) (where $1 \le i \le I$ and $1 \le j \le J$) of the downscaled input image signal DSRGB.

The saturation S and the brightness V(S) are represented as S=(Max−Min)/Max, and V(S)=Max. The saturation S can have a value from 0 to 1. The brightness V(S) can have a value from 0 to $(2^n-1)$, where n is the number of display gradation bits. Max is the maximum value of the input signals of the first, second, and third colors (with signal values $dx_{1\_(i,j)}$, $dx_{2\_(i,j)}$, and $dx_{3\_(i,j)}$, respectively). Min is the minimum value of the input signals of the first, second, and third colors (with signal values $dx_{1\_(i,j)}$, $dx_{2\_(i,j)}$, and $dx_{3\_(i,j)}$, respectively). The hue H is represented in degrees from 0 to 360. The hue H changes from 0 degrees toward 360 degrees as red, yellow, green, cyan, blue, magenta, and red.

In the embodiment, the image analyzer 24 can obtain the signal value $DX_{4\_(i,j)}$ based on the product of the $Min_{(i,j)}$ and the extension coefficient α. Specifically, the image analyzer 24 can obtain the signal value $DX_{4\_(i,j)}$ using Expression (4) below. In Expression (4), the product of the $Min_{(i,j)}$ and the extension coefficient α is divided by the constant χ, but the calculation is not limited to this calculation. The constant χ will be described later.

$$DX_{4\_(i,j)} = Min_{(i,j)} \cdot \alpha / \chi \tag{4}$$

In general, in the (i,j)th element (pixel) (where $1 \le i \le I$ and $1 \le j \le J$), the saturation $S_{(i,j)}$ and the value (brightness) $V(S)_{(i,j)}$ in the cylindrical HSV color space can be obtained using Expressions (5) and (6) below based on the input signal of the first color (signal value $dx_{1\_(i,j)}$), the input signal of the second color (signal value $dx_{2\_(i,j)}$), and the input signal of the third color (signal value $dx_{3\_(i,j)}$).

$$S_{(i,j)} = [Max_{(i,j)} - Min_{(i,j)}] / Max_{(i,j)} \tag{5}$$

$$V(S)_{(i,j)} = Max_{(i,j)} \tag{6}$$

In the above expressions, $Max_{(i,j)}$ is the maximum value of the three input signal values $dx_{1\_(i,j)}$, $dx_{2\_(i,j)}$, and $dx_{3\_(i,j)}$, and $Min_{(i,j)}$ is the minimum value of the three input signal values $dx_{1\_(i,j)}$, $dx_{2\_(i,j)}$, and $dx_{3\_(i,j)}$. In the embodiment, n=8. That is, the number of display gradation bits is set to 8 bits (the value of the display gradation is set to 256 gradations of 0 to 255).

No color filter is disposed on the fourth sub-pixel 49W for displaying white. The fourth sub-pixel 49W for displaying the fourth color may be designed so as to be brighter than the first sub-pixel 49R for displaying the first color, the second sub-pixel 49G for displaying the second color, and the third sub-pixel 49B for displaying the third color, when the four sub-pixels are irradiated with the same light source lighting amount. With this design, a display having a high maximum luminance is obtained. If luminance of a chromatic color is intended to have a higher priority when only each one of the sub-pixels 49R, 49G, and 49B is lit up, the fourth sub-pixel 49W can be designed to be smaller than that when the fourth sub-pixel 49W is designed so as to be brighter than the first sub-pixel 49R, the second sub-pixel 49G, and the third sub-pixel 49B.

The following discusses a case where the first sub-pixel 49R receives a signal having a value corresponding to the maximum signal value of the output signal of the first sub-pixel 49R, the second sub-pixel 49G receives a signal having a value corresponding to the maximum signal value of the output signal of the second sub-pixel 49G, and the third sub-pixel 49B receives a signal having a value corresponding to the maximum signal value of the output signal of the third sub-pixel 49B. In this case, let $BN_{1-3}$ denote the luminance of a set of the first sub-pixel 49R, the second sub-pixel 49G, and the third sub-pixel 49B included in the pixel 48 or a group of pixels 48. That is, the set of the first sub-pixel 49R, the second sub-pixel 49G, and the third sub-pixel 49B displays white having the maximum luminance, and the luminance of this white is represented by $BN_{1-3}$.

Assume that $BN_4$ denotes the luminance of the fourth sub-pixel 49W when the fourth sub-pixel 49W included in the pixel 48 or the group of the pixels 48 receives a signal having a value corresponding to the maximum signal value of the output signal of the fourth sub-pixel 49W. Accordingly, assuming that χ denotes the constant depending on the display device 10, the constant χ is represented as $\chi = BN_4 / BN_{1-3}$.

Specifically, assuming that the fourth sub-pixel 49W receives the input signal having a display gradation value of 255, the luminance $BN_4$ is, for example, 1.5 times the luminance $BN_{1-3}$ of white when the set of the first sub-pixel 49R, the second sub-pixel 49G, and the third sub-pixel 49B receives the signal value $dx_{1\_(i,j)}$ of 255, the signal value $dx_{2\_(i,j)}$ of 255, and the signal value $dx_{3\_(i,j)}$ of 255 as the input signals having such display gradation values. That is, χ=1.5 in the embodiment.

When the signal value $DX_{4\_(p,q)}$ is given by Expression (4) given above, Vmax(S) can be represented by Expressions (7) and (8) given below.

When $S \le S_0$, $$V\max(S) = (\chi+1) \cdot (2^n - 1) \tag{7}$$

When $S_0 < S \le 1$, $$V\max(S) = (2^n - 1) \cdot (1/S) \tag{8}$$

where $S_0 = 1/(\chi+1)$.

The thus-obtained maximum value Vmax(S) of the brightness using the saturation S as a variable in the HSV color space extended by adding the fourth color is stored in the signal processor 20, for example, as a kind of look-up table. Alternatively, the signal processor 20 obtains the maximum value Vmax(S) of the brightness using the saturation S as a variable in the extended HSV color space as occasion demands.

The following describes a method (extension processing) for obtaining the signal values $DX_{1\_(i,j)}$, $DX_{2\_(i,j)}$, $DX_{3\_(i,j)}$, and $DX_{4\_(i,j)}$ serving as the signals in the (i,j)th element (pixel) (where $1 \le i \le I$ and $1 \le j \le J$) of the downscaled input image signal DSRGB. The following processing is performed so as to keep a ratio of the luminance of the first primary color displayed by (first sub pixel 49R+fourth sub pixel 49W) to the luminance of the second primary color displayed by (second sub pixel 49G+fourth sub pixel 49W) to the luminance of the third primary color displayed by (third sub pixel 49B+fourth sub pixel 49W). The processing is performed so as to keep (maintain) also a color tone. The processing is performed so as to keep (maintain) further a gradation-luminance characteristic (gamma characteristic, γ characteristic). When all the input signal values are zero or small in any one of the pixels 48 or any group of the pixels 48, the extension coefficient α only needs to be obtained without including such a pixel 48 or such a group of the pixels 48.

First Process

First, the image analyzer 24 obtains the saturation S and the brightness V(S) of the (i,j)th element (pixel) (where $1 \leq i \leq I$ and $1 \leq j \leq J$) of the downscaled input image signal DSRGB based on the signal values of the (i,j)th element (pixel) of the downscaled input image signal DSRGB. Specifically, the image analyzer 24 obtains the saturation $S_{(i,j)}$ and the brightness $V(S)_{(i,j)}$ using Expressions (7) and (8) based on the signal value $dx_{1\_(i,j)}$ serving as the input signal of the first color, the signal value $dx_{2\_(i,j)}$ serving as the input signal of the second color, and the signal value $dx_{3\_(i,j)}$ serving as the input signal of the third color of the (i,j)th element (pixel). The image analyzer 24 performs this processing on all the elements (pixels) of the downscaled input image signal DSRGB.

Second Process

Subsequently, the image analyzer 24 obtains the extension coefficient $\alpha(S)$ using Expression (9) below based on Vmax(S)/V(S) obtained for the elements (pixels) of the downscaled input image signal DSRGB.

$$\alpha(S) = V\max(S)/V(S) \qquad (9)$$

Third Process

Subsequently, the image analyzer 24 obtains the signal value $DX_{4\_(i,j)}$ of the (i,j)th element (pixel) (where $1 \leq i \leq I$ and $1 \leq j \leq J$) of the downscaled input image signal DSRGB at least based on the signal value $dx_{1\_(i,j)}$, the signal value $dx_{2\_(i,j)}$, and the signal value $dx_{3\_(i,j)}$. In the embodiment, the image analyzer 24 determines the signal value $DX_{4\_(i,j)}$ based on the $Min_{(i,j)}$, the extension coefficient $\alpha$, and the constant $\chi$. More specifically, as described above, the image analyzer 24 obtains the signal value $DX_{4\_(i,j)}$ using Expression (4) given above. The image analyzer 24 obtains the signal value $DX_{4\_(i,j)}$ of each of the elements (pixels) of the downscaled input image signal DSRGB.

Fourth Process

Then, the image analyzer 24 obtains the signal value $DX_{1\_(i,j)}$ of the (i,j)th element (pixel) (where $1 \leq i \leq I$ and $1 \leq j \leq J$) of the downscaled input image signal DSRGB based on the signal value $dx_{1\_(i,j)}$, the extension coefficient $\alpha$, and the signal value $DX_{4\_(i,j)}$. The image analyzer 24 obtains the signal value $DX_{2\_(i,j)}$ of the (i,j)th element (pixel) of the downscaled input image signal DSRGB based on the signal value $dx_{2\_(i,j)}$, the extension coefficient $\alpha$, and the signal value $DX_{4\_(i,j)}$. The image analyzer 24 obtains the signal value $DX_{3\_(i,j)}$ of the (i,j)th element (pixel) of the downscaled input image signal DSRGB based on the signal value $dx_{3\_(i,j)}$, the extension coefficient $\alpha$, and the signal value $DX_{4\_(i,j)}$. Specifically, the image analyzer 24 uses Expressions (1) to (3) given above to obtain the signal value $DX_{1\_(i,j)}$, the signal value $DX_{2\_(i,j)}$, and the signal value $DX_{3\_(i,j)}$ of the (i,j)th element (pixel) of the downscaled input image signal DSRGB.

The image analyzer 24 extends the value of $Min_{(i,j)}$ using the extension coefficient $\alpha$, as represented by Expression (4). In this manner, the extension of the value of $Min_{(i,j)}$ by the extension coefficient $\alpha$ increases the luminance of the white display sub-pixel (fourth sub-pixel 49W), and also increases the luminance of the red display sub-pixel, the green display sub-pixel, and the blue display sub-pixel (corresponding to the first sub-pixel 49R, the second sub-pixel 49G, and the third sub-pixel 49B, respectively) as represented by the expressions given above. As a result, dullness in color can be avoided. That is, the extension of the value of $Min_{(i,j)}$ by the extension coefficient $\alpha$ increases the luminance of the entire image by a factor of $\alpha$ relative to the case where the value of $Min_{(i,j)}$ is not extended. Accordingly, for example, a still image and the like can be displayed with high luminance, which is preferable.

As described above, the signal value $DX_{1\_(i,j)}$, the signal value $DX_{2\_(i,j)}$, the signal value $DX_{3\_(i,j)}$, and the signal value $DX_{4\_(i,j)}$ in the (i,j)th element (pixel) (where $1 \leq i \leq I$ and $1 \leq j \leq J$) of the downscaled input image signal DSRGB are extended by a factor of $\alpha$. Therefore, to make the luminance of the image in the extended state equal to that of the image in the unextended state, the display device 10 only needs to reduce the luminance of the planar light source device 50 based on the extension coefficient $\alpha$. Specifically, the light source drive value calculator 25 only needs to individually independently control the current or the duty cycle of each of the light sources 56A to 56J so as to reduce the luminance of the planar light source device 50 by a factor of $1/\alpha$.

Figure 8:
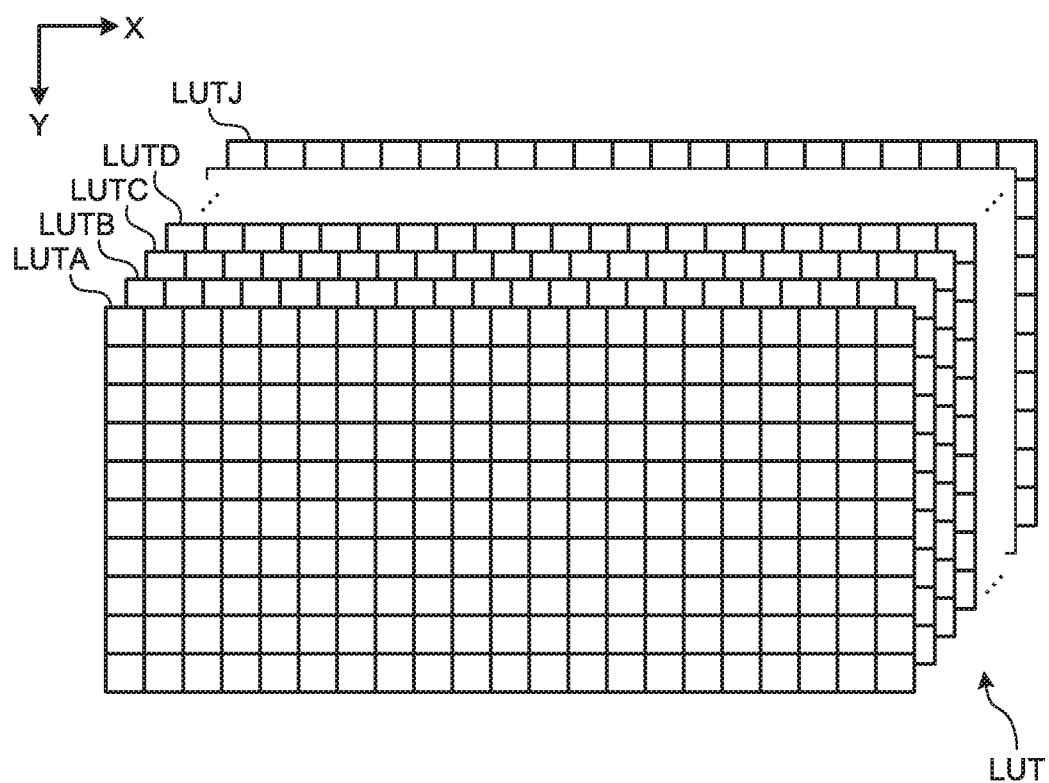
FIG. 8 is a diagram explaining look-up tables stored in the display device according to the embodiment.

FIG. 8 is a diagram explaining look-up tables stored in the display device according to the embodiment. The light source data storage 26 stores therein LB look-up tables (LUT) serving as data containing the representative value for the light intensity for each of the elements arranged in a matrix (row-column configuration), in which K elements are arranged in the light source arrangement direction X, and L elements are arranged in the light-entering direction Y. Here, LB is the number of the light sources 56A to 56J. In the embodiment, LB=10.

Look-up tables LUTA to LUTJ each have a matrix configuration (row-column configuration), in which K elements are arranged in the light source arrangement direction X, and L elements are arranged in the light-entering direction Y. Here, K<I (I=32 in the embodiment), and L<J (J=18 in the embodiment). The number of the elements K×L of each of the look-up tables LUTA to LUTJ is a mere example, and is not limited thereto. The elements of each of the look-up tables LUTA to LUTJ correspond to the light intensity distribution at points 58 in FIG. 3 explained above. For example, as illustrated in FIG. 3, K can be the sum of the number of fronts of the light sources 56A to 56J, the number of gaps between the light sources 56A to 56J, the number of outside of the light source 56A, and the number of outside of the light source 56J. When the number of the light sources is LB, K can be 2LB+1. In the embodiment, since the number of the light sources 56A to 56J is 10, K is 21. The value of L differs depending on the characteristics of the planar light source device 50, and is preferably the minimum value capable of reproducing the luminance distribution. In the embodiment, L=10. The setting can reduce the size of each of the look-up tables LUTA to LUTJ.

As illustrated in FIG. 8, the light source data storage 26 stores therein, as the look-up table LUTA, the information on the light intensity distribution of the light that is emitted from the light source 56A and transmitted to the flat surface of the image display panel 30 from the light guide plate 54 when only the light source 56A illustrated in FIG. 3 is lit up. The light source data storage 26 stores therein, as the look-up table LUTB, the information on the light intensity distribution of the light that is emitted from the light source 56B and transmitted to the surface of the image display panel 30 from the light guide plate 54 when only the light source 56B illustrated in FIG. 3 is lit up.

The light source data storage 26 stores, as the look-up table LUTC, the information on the light intensity distribution of the light that is emitted from the light source 56C and transmitted to the flat surface of the image display panel 30 from the light guide plate 54 when only the light source 56C illustrated in FIG. 3 is lit up.

FIG. 9 is a diagram explaining one of the look-up tables stored in the display device according to the embodiment. FIG. 9 is a diagram illustrating an example of the look-up table LUTC. The graph of FIG. 4 explained above is obtained by three-dimensionally plotting the look-up table LUTC of FIG. 9.

Referring again to FIG. 8, in the same manner as the above, the light source data storage 26 stores therein, as each of the look-up tables LUTD to LUTJ, the information on the light intensity distribution of the light that is emitted from a corresponding one of the light sources 56D to 56J and transmitted to the flat surface of the image display panel 30 from the light guide plate 54 when only the corresponding one of the light sources 56D to 56J illustrated in FIG. 3 is lit up.

The look-up tables LUTA to LUTJ correspond to the light sources 56A to 56J, respectively.

In the embodiment, since the number of elements of each of the look-up tables LUTA to LUTJ is K×L (where K<$P_0$ and L<$Q_0$), the size of each of the look-up tables LUTA to LUTJ can be reduced.

Among the light sources 56A to 56J, the light source data storage 26 may store therein a look-up table obtained when a set of the light sources 56A and 56B is simultaneously lit up, a look-up table obtained when a set of the light sources 56C and 56D is simultaneously lit up, a look-up table obtained when a set of the light sources 56E and 56F is simultaneously lit up, a look-up table obtained when a set of the light sources 56G and 56H is simultaneously lit up, and a look-up table obtained when a set of the light sources 56I and 56J is simultaneously lit up, as look-up tables of the embodiment. This approach can save the labor of work for generating the look-up tables, and can reduce the storage capacity of the light source data storage 26. As a result, the size of an integrated circuit for containing the light source data storage 26 can be reduced.

When the light sources 56A to 56E are disposed axisymmetrically to the light sources 56F to 56J with respect to a center line Xc of the light guide plate 54 in the light source arrangement direction X, the look-up tables LUTA to LUTE on one side of the center line Xc of the light guide plate 54 in the light source arrangement direction X may be generated and stored in the light source data storage 26 among the look-up tables LUTA to LUTJ. The look-up tables LUTF to LUTJ on the other side may be omitted because they are axisymmetric to the look-up tables LUTA to LUTE with respect to the center line Xc.

The light source drive value calculator 25 determines drive values of the light sources 56A to 56J so as to satisfy the luminance required by the pixels. Referring again to FIG. 7, the light source drive value calculator 25 calculates the light source lighting amounts at Step S108. To describe this in detail, the light source drive value calculator 25 superimposes the look-up tables LUTA to LUTJ stored in the light source data storage 26, and determines the light source lighting amounts of the light sources 56A to 56J such that the luminance at which each of the pixels 48 in the image display panel 30 is irradiated by the planar light source device 50 is scaled by a factor of approximately 1/α. The light source drive value calculator 25 outputs the planar light source device control signal SBL to the planar light source device controller 60 so as to light up the light sources 56A to 56J at the determined light source lighting amounts.

For example, the light source drive value calculator 25 can calculate the representative luminance T(k,l) (where 1≤k≤K and 1≤l≤L) obtained by superimposing the (k,l)th elements (where 1≤k≤K and 1≤l≤L) of the look-up tables LUTA to LUTJ, using Expression (10) below.

$$T(k, 1) = \sum_{h=1}^{LB} T_{h(k,1)} \alpha_h \quad (10)$$

$T_{h(k,l)}$: Look-up table for each light source
$\alpha_h$: Each light source current In this manner, the light source drive value calculator 25 replaces complicated arithmetic processing with the simple processing of referring to the look-up tables LUTA to LUTJ, and can thereby reduce the amount of calculation.

At Step S110, the luminance distribution data generator 27 generates the first luminance distribution data DSBR having the representative luminance T(k,l) (where 1≤k≤K and 1≤l≤L) calculated at Step S108 as elements thereof. That is, the number of elements of the first luminance distribution data DSBR is K×L. Accordingly, the planar density of the first luminance distribution data DSBR is lower than that of the second luminance distribution data SBR.

To display the image on the image display panel 30, the signal output circuit 41 needs the luminance distribution on a per pixel 48 basis. That is, the signal output circuit 41 needs the third luminance distribution data SB having the number of elements of $P_0 \times Q_0$.

Therefore, at Step S112, the upscaler 28 performs the upscaling to generate the second luminance distribution data SBR by increasing the number of elements (K×L) of the first luminance distribution data DSBR, and transmits the generated second luminance distribution data SBR to the signal output circuit 41.

The upscaler 28 might be configured to generate the third luminance distribution data SB having the number of elements of $P_0 \times Q_0$ by upscaling the first luminance distribution data DSBR having the number of elements of K×L. If, however, the upscaler 28 generates the third luminance distribution data SB having the number of elements of $P_0 \times Q_0$ by upscaling the first luminance distribution data DSBR having the number of elements of K×L, the processing load of the signal processor 20 increases. The communication load also increases to transmit the third luminance distribution data SB from the upscaler 28 to the signal output circuit 41.

Therefore, in the display device 10, the upscaler 28 generates the second luminance distribution data SBR having the number of elements of M×N. Here, K<M<$P_0$, and L<N<$Q_0$. In the embodiment, M=320, and N=180. With this configuration, the display device 10 can reduce the communication load between the signal processor 20 and the signal output circuit 41.

Figure 10:
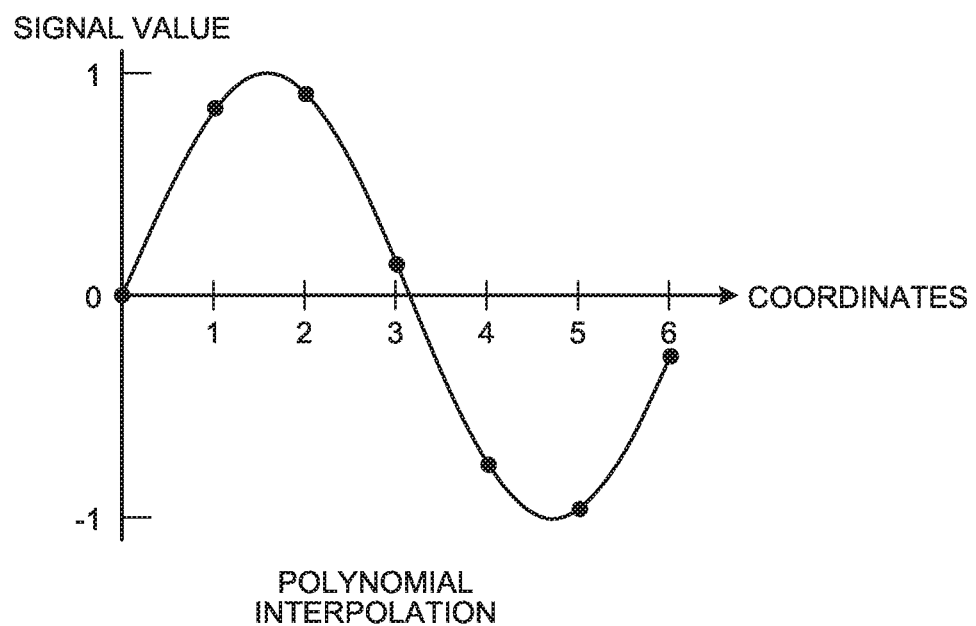
FIG. 10 is an explanatory diagram for explaining a calculation of a polynomial interpolation.

Although the upscaler 28 can employ various types of interpolation techniques, the upscaler 28 preferably employs an interpolation technique placing a greater importance on the viewpoint of accuracy than the viewpoint of the computational load. For example, the upscaler 28 preferably employs the polynomial interpolation. FIG. 10 is an explanatory diagram for explaining a calculation of the polynomial interpolation.

The upscaler 28 can generate the second luminance distribution data SBR at required accuracy by employing the polynomial interpolation. If, for example, the upscaler 28 employs the linear interpolation, the upscaler 28 is difficult to generate the second luminance distribution data SBR having the number of elements of M×N (320×180) at required accuracy by upscaling the first luminance distribution data DSBR having the number of elements of K×L (21×10).

Examples of the polynomial interpolation include a bicubic interpolation, but are not limited thereto. The bicubic interpolation is an interpolation technique of calculating a signal value of a point to be interpolated based on signal values of 16 points in the vicinity of the point to be interpolated.

The polynomial interpolation is made by a more complicated calculation than that of the linear interpolation, and therefore is more preferably implemented by software than by hardware. Accordingly, the employment of the polynomial interpolation by the upscaler 28 is well matched with the implementation of the signal processor 20 by the host CPU and the software. When the signal processor 20 is implemented by the hardware, the circuit thereof needs to be changed to adjust the algorithm or the parameters of the polynomial interpolation. When, instead, the signal processor 20 is implemented by the host CPU and the software, the signal processor 20 only needs to be changed in the software to adjust the algorithm or the parameters of the polynomial interpolation, and need not be changed in the circuit.

Referring again to FIG. 7, the gamma converter 43 performs the gamma conversion on the input image signal SRGB at Step S114.

At Step S116, the upscaler 44 performs the upscaling to generate the third luminance distribution data SB having the number of elements of $P_0 \times Q_0$ by upscaling the second luminance distribution data SBR having the number of elements of M×N.

Figure 11:
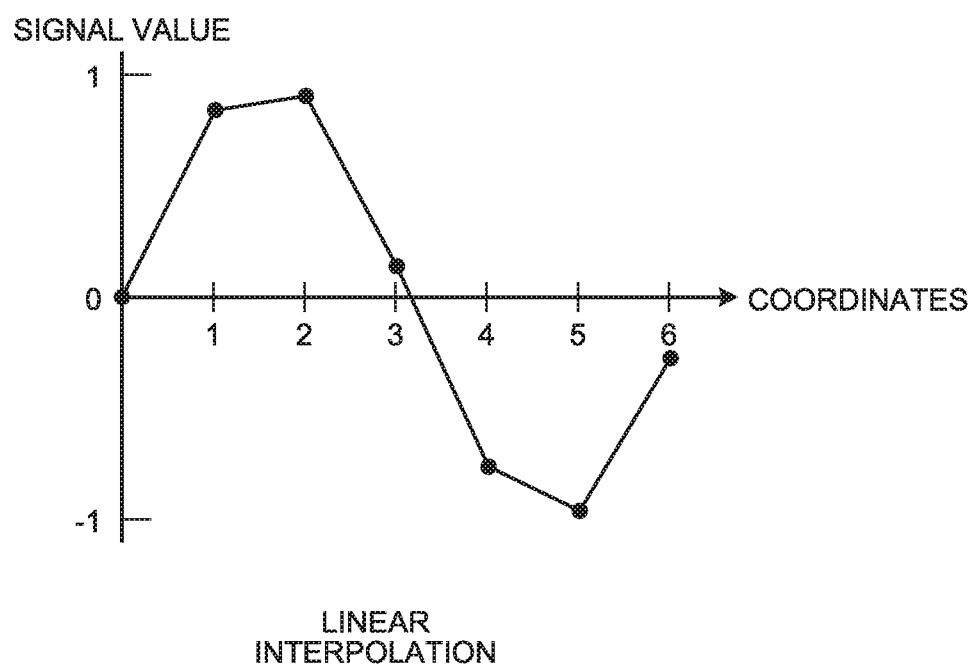
FIG. 11 is an explanatory diagram for explaining a calculation of a linear interpolation.

Although the upscaler 44 can employ various types of interpolation, the upscaler 44 preferably employs an interpolation placing a greater importance on the viewpoint of the computational load than the viewpoint of accuracy. For example, the upscaler 44 preferably employs the linear interpolation. FIG. 11 is an explanatory diagram for explaining a calculation of the linear interpolation.

The upscaler 44 can generate the third luminance distribution data SB having the number of elements of $P_0 \times Q_0$ at required accuracy with a lower load by employing the linear interpolation. This is because the luminance distribution of the second luminance distribution data SBR having the number of elements of M×N smoothly changes. If, for example, the upscaler 44 employs the polynomial interpolation, the computational load is larger, and the accuracy is unnecessarily higher.

Examples of the linear interpolation include a bilinear interpolation, but are not limited thereto. The bilinear interpolation is an interpolation technique of calculating the signal value of the point to be interpolated based on signal values of 4 points in the vicinity of the point to be interpolated.

The linear interpolation is made by a simpler calculation than that of the polynomial interpolation, and therefore is more preferably implemented by hardware than by software. Accordingly, the employment of the linear interpolation by the upscaler 44 is well matched with the implementation of the signal output circuit 41 by the hardware. The necessity of adjustment of the algorithm or parameters of the linear interpolation is lower than that of the polynomial interpolation, and therefore the necessity of circuit change is lower than that of the polynomial interpolation.

Steps S114 and S116 can be performed in parallel.

At Step S118, the image processor 45 performs image processing to generate the output image signal SRGBW by processing the input image signal SRGB after being subjected to the gamma conversion. To describe this in detail, the image processor 45 adjusts the luminance of the input image signal SRGB having the number of elements (pixels) of $P_0 \times Q_0$ based on the third luminance distribution data SB having the number of elements of $P_0 \times Q_0$. In this manner, the image processor 45 calculates the output image signal SRGBW the number of elements (pixels) of which is $P_0 \times Q_0$.

At Step S120, the inverse gamma converter 46 performs inverse gamma conversion on the output image signal SRGBW, and outputs the result to the pixels in the image display panel 30.

The image display panel driver 40 displays an image frame by frame on the image display panel 30 based on the synchronizing signal STM, and the planar light source device controller 60 independently drives each of the light sources 56A to 56J of the planar light source device 50. In this manner, the display device 10 can control the light sources 56A to 56J so as to be capable of reducing the total amount of the light source lighting amounts thereof, and can thus reduce the power consumption.

3. Operation Timing Example of Display Device

Figure 12:
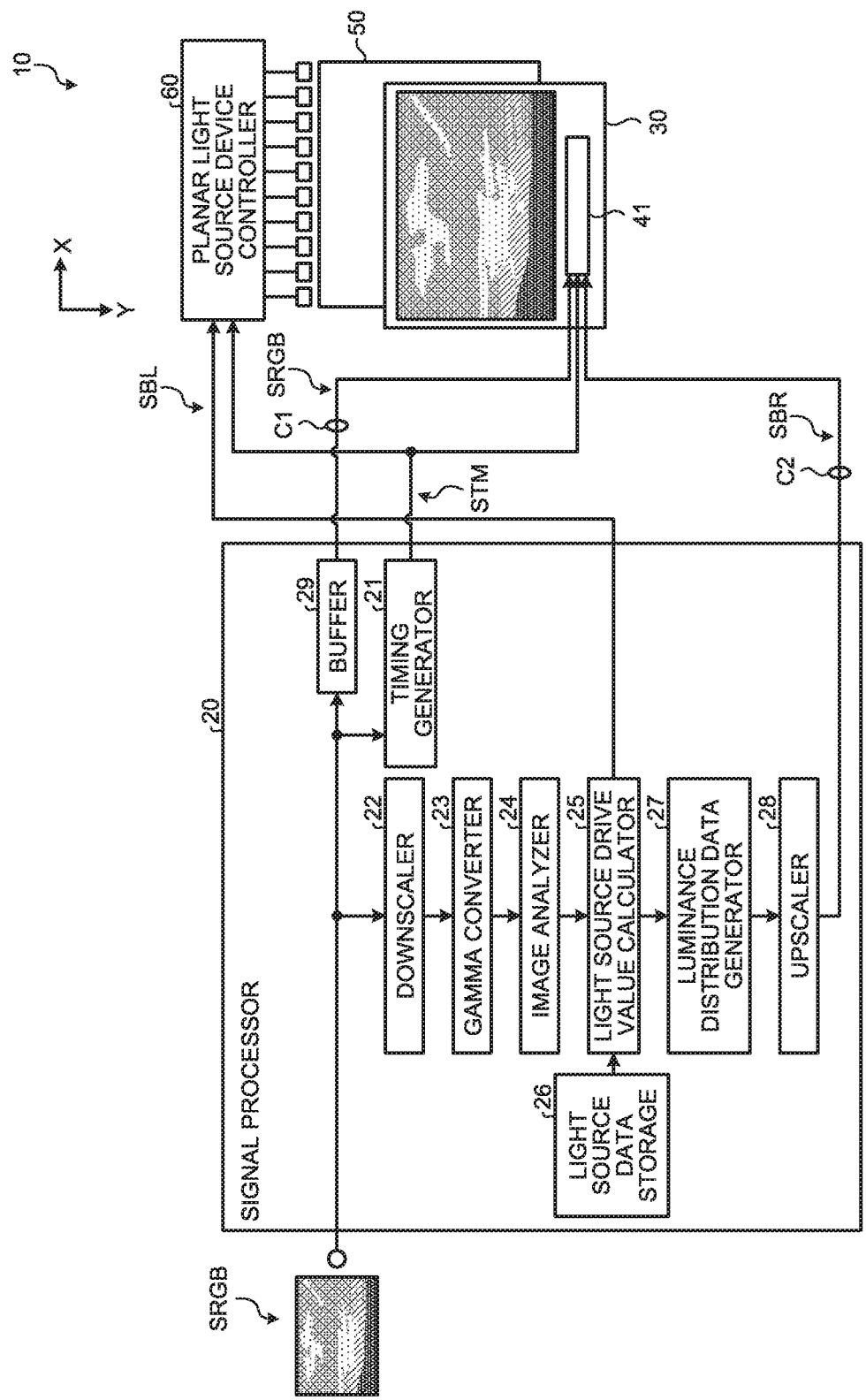
FIG. 12 is a schematic diagram of the display device according to the embodiment.
Figure 13:
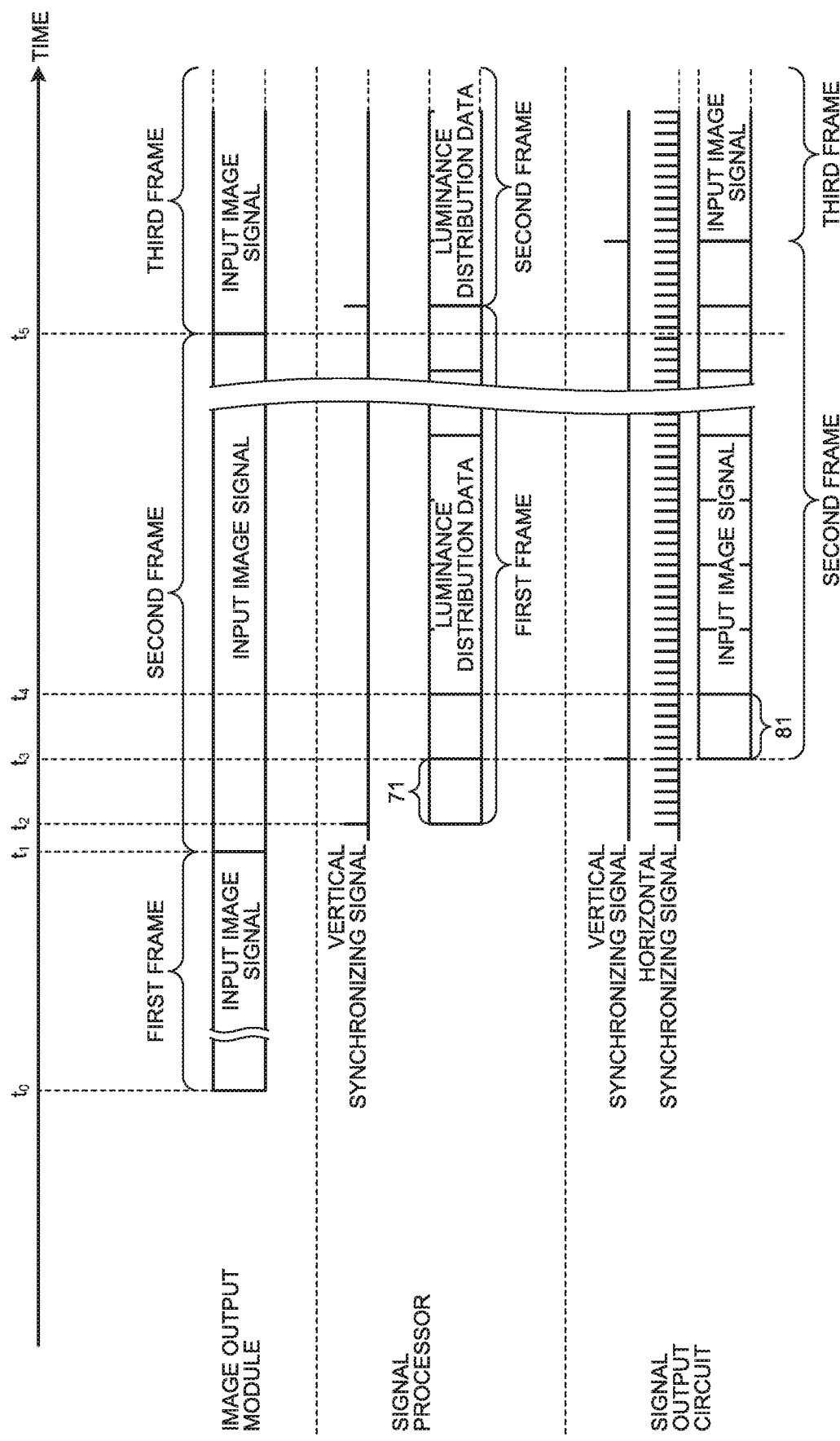
FIG. 13 is a timing diagram illustrating an operation timing example of the display device according to the embodiment.

FIG. 12 is a schematic diagram of the display device according to the embodiment. FIG. 13 is a timing diagram illustrating an operation timing example of the display device according to the embodiment.

To reduce the circuit scale of the signal output circuit 41, the signal processor 20 preferably shifts the phase between the input image signal SRGB transmitted through the communication path C1 and the second luminance distribution data SBR transmitted through the communication path C2. To describe this in detail, the signal output circuit 41 generates the third luminance distribution data SB by upscaling the second luminance distribution data SBR. For this reason, the signal processor 20 preferably transmit, to the signal output circuit 41, the second luminance distribution data SBR earlier than the transmission of the input image signal SRGB by a period of time needed for the upscaling calculation performed by the signal output circuit 41. As a result, the signal output circuit 41 needs no circuit for buffering the input image signal SRGB.

Each Horizontal band illustrated in FIG. 13 indicates that a signal is output. Referring to FIG. 13, the image output module 11 outputs the input image signal SRGB of the first frame to the signal processor 20 during a period from time $t_0$ to time $t_1$. The image output module 11 outputs the input image signal SRGB of the second frame to the signal processor 20 during a period from time $t_1$ to time $t_5$. The image output module 11 outputs the input image signal SRGB of the third frame to the signal processor 20 from time $t_5$.

The downscaler 22, the gamma converter 23, the image analyzer 24, the light source drive value calculator 25, the luminance distribution data generator 27, and the upscaler 28 of the signal processor 20 generate the second luminance distribution data SBR based on the input image signal SRGB of the first frame. At time $t_2$, the upscaler 28 starts transmitting the second luminance distribution data SBR generated based on the input image signal SRGB of the first frame to the signal output circuit 41.

At time $t_2$, the signal output circuit 41 starts generating the third luminance distribution data SB by starting upscaling data 71, the date 71 being a part of the second luminance distribution data SBR generated based on the input image signal SRGB of the first frame.

At time $t_3$, the buffer 29 of the signal processor 20 starts transmitting the input image signal SRGB of the second frame to the signal output circuit 41. That is, at time $t_3$, the signal processor 20 synchronizes the input image signal SRGB of the second frame with the data 71 that is a part of the second luminance distribution data SBR generated based on the input image signal SRGB of the first frame.

During a period from time $t_3$ to time $t_4$, the signal output circuit 41 outputs an output image signal based on the data upscaled from the data 71 that is a part of the second luminance distribution data SBR generated based on the input image signal SRGB of the first frame. To describe this in detail, the signal output circuit 41 outputs, to the image display panel 30, the output image signal based on an input image signal 81 of a region of the input image signal SRGB of the second frame, the region corresponding to the upscaled data. As a result, the signal output circuit 41 needs no circuit for buffering the input image signal SRGB.

The display device 10 can display an image based on the input image signal SRGB of the present time (second frame) based on the second luminance distribution data SBR of the immediately preceding frame (first frame). That is, the display device 10 can limit the delay of the second luminance distribution data SBR to one frame time. As a result, even when displaying a fast moving-image, the display device 10 can provide suitable luminance of the image.

As described above, in the display device 10, the signal processor 20 generates the second luminance distribution data SBR having the number of elements of M×N, and transmits it to the signal output circuit 41. In addition, the signal output circuit 41 generates the third luminance distribution data SB having the number of elements of $P_0 \times Q_0$ by upscaling the second luminance distribution data SBR having the number of elements of M×N. As a result, the display device 10 can reduce the processing load of the signal processor 20. The display device 10 can also reduce the communication load between the signal processor 20 and the signal output circuit 41. In addition, to adjust the algorithm or the parameters of the creation of the second luminance distribution data SBR, or to adjust the algorithm or the parameters of the polynomial interpolation, the display device 10 only needs to be changed in the software for implementing the signal processor 20, and need not be changed in the circuit of the signal output circuit 41.

In the display device 10, the signal processor 20 generates the second luminance distribution data SBR having the number of elements of M×N, and transmits it to the signal output circuit 41. As a result, the display device 10 can reduce the circuit scale of the signal output circuit 41.

The upscaler 44 in the signal output circuit 41 of the display device 10 can be designed to be simpler by appropriately setting the number of elements M×N of the second luminance distribution data SBR.

Any change in configuration of the planar light source device 50 of the display device 10 can be dealt with by only changing the software for implementing the signal processor 20, thus eliminating the need for change in the circuit of the signal output circuit 41. For example, in the embodiment, the example has been described in which the planar light source device 50 includes the light sources 56A to 56J arranged on one side surface of the light guide plate 54, as illustrated in FIG. 3. In some cases, however, the planar light source device 50 includes a plurality of (R×S) light sources arranged in a two-dimensional matrix (with R rows and S columns) on the back side of the light guide plate 54, and the (R×S) light sources emit the light to the back side of the light guide plate 54. Even in this case, any change in configuration of the display device 10 can be dealt with by only changing the software for implementing the signal processor 20 and a plurality of (R×S) look-up tables stored in the light source data storage 26, thus eliminating the need for change in the circuit of the signal output circuit 41.

4. First Modification

Figure 14:
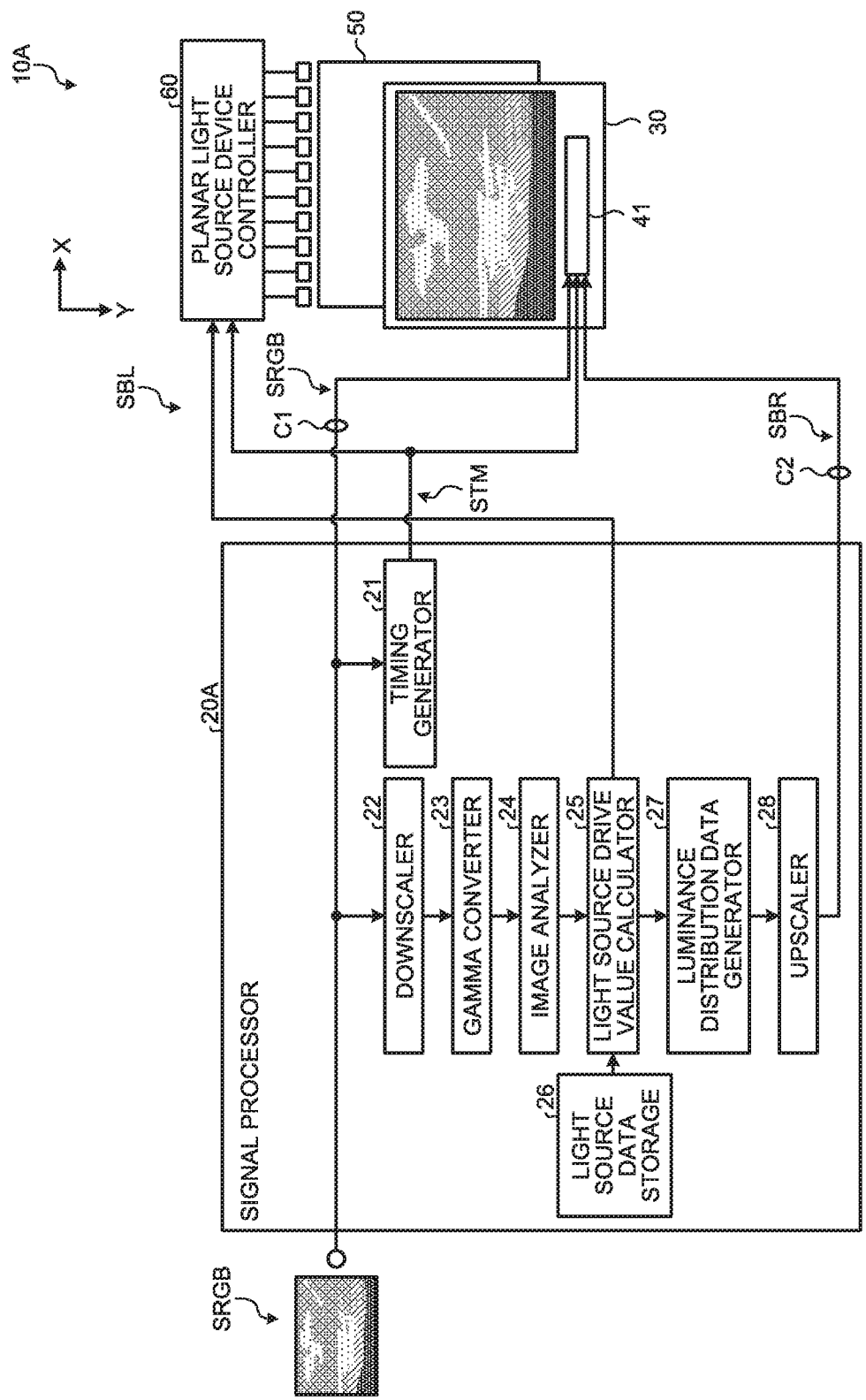
FIG. 14 is a schematic diagram of a display device according to a first modification of the embodiment.
Figure 15:
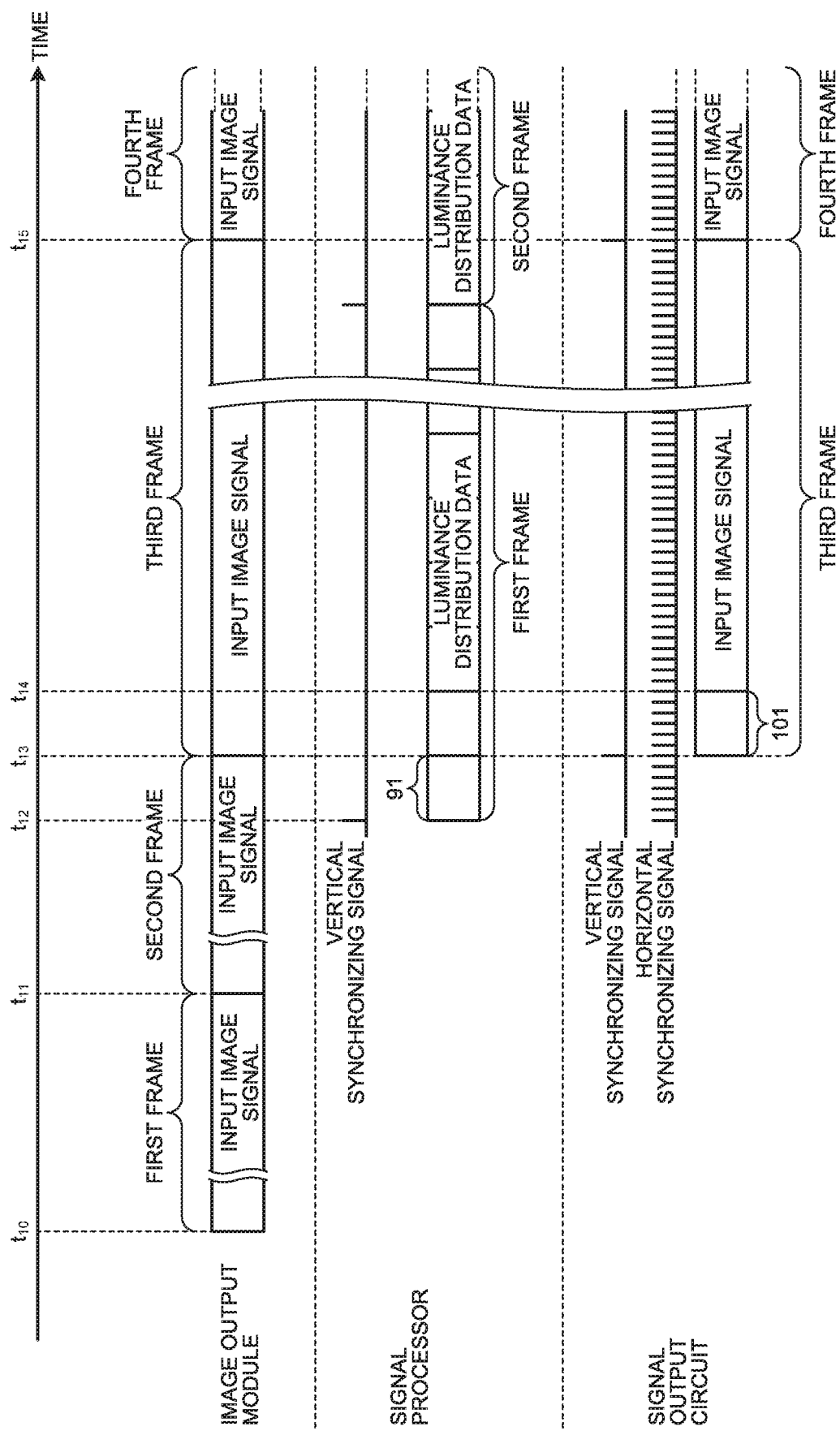
FIG. 15 is a timing diagram illustrating an operation timing example of the display device according to the first modification of the embodiment.

FIG. 14 is a schematic diagram of a display device according to a first modification of the embodiment. FIG. 15 is a timing diagram illustrating an operation timing example of the display device according to the first modification of the embodiment. Unlike the signal processor 20, a signal processor 20A of this display device 10A does not include the buffer 29. Accordingly, the signal processor 20A directly transmits the input image signal SRGB received from the image output module 11 to the signal output circuit 41 without buffering the input image signal SRGB.

Referring to FIG. 15, the image output module 11 outputs the input image signal SRGB of the first frame to the signal processor 20A during a period from time $t_{10}$ to time $t_{11}$. The image output module 11 outputs the input image signal SRGB of the second frame to the signal processor 20A during a period from time $t_{11}$ to time $t_{13}$. The image output module 11 outputs the input image signal SRGB of the third frame to the signal processor 20A during a period from time $t_{13}$ to time $t_{15}$. The image output module 11 outputs the input image signal SRGB of the fourth frame to the signal processor 20A from time $t_{15}$.

The downscaler 22, the gamma converter 23, the image analyzer 24, the light source drive value calculator 25, the luminance distribution data generator 27, and the upscaler 28 of the signal processor 20A generate the second luminance distribution data SBR based on the input image signal SRGB of the first frame. At time $t_{12}$, the upscaler 28 starts transmitting, to the signal output circuit 41, the second luminance distribution data SBR generated based on the input image signal SRGB of the first frame.

At time $t_{12}$, the signal output circuit 41 starts generating the third luminance distribution data SB by starting upscaling data 91, the data being a part of the second luminance distribution data SBR generated based on the input image signal SRGB of the first frame.

At time $t_{13}$, the signal processor 20A starts transmitting the input image signal SRGB of the third frame received from the image output module 11 to the signal output circuit 41.

During a period from time $t_{13}$ to time $t_{14}$, the signal output circuit 41 outputs an output image signal based on the data upscaled from the data 91 serving as the part of the second luminance distribution data SBR generated based on the input image signal SRGB of the first frame. To describe this in detail, the signal output circuit 41 outputs, to the image display panel 30, the output image signal based on an input image signal 101 of a region of the input image signal SRGB of the third frame, the region corresponding to the upscaled data.

The display device 10A can display an image based on the input image signal SRGB of the present time (third frame), based on the second luminance distribution data SBR of the frame (first frame) two frames before the third frame.

As described above, the signal processor 20A of the display device 10A according to the first modification can eliminate the buffer 29. In the timing diagram illustrated in FIG. 15, unlike in that illustrated in FIG. 13, the signal processor 20A can spend up to less than one frame time as a time for calculating the second luminance distribution data SBR. As a result, the signal processor 20A can reduce the peak power for calculating the second luminance distribution data SBR.

5. Second Modification

Figure 16:
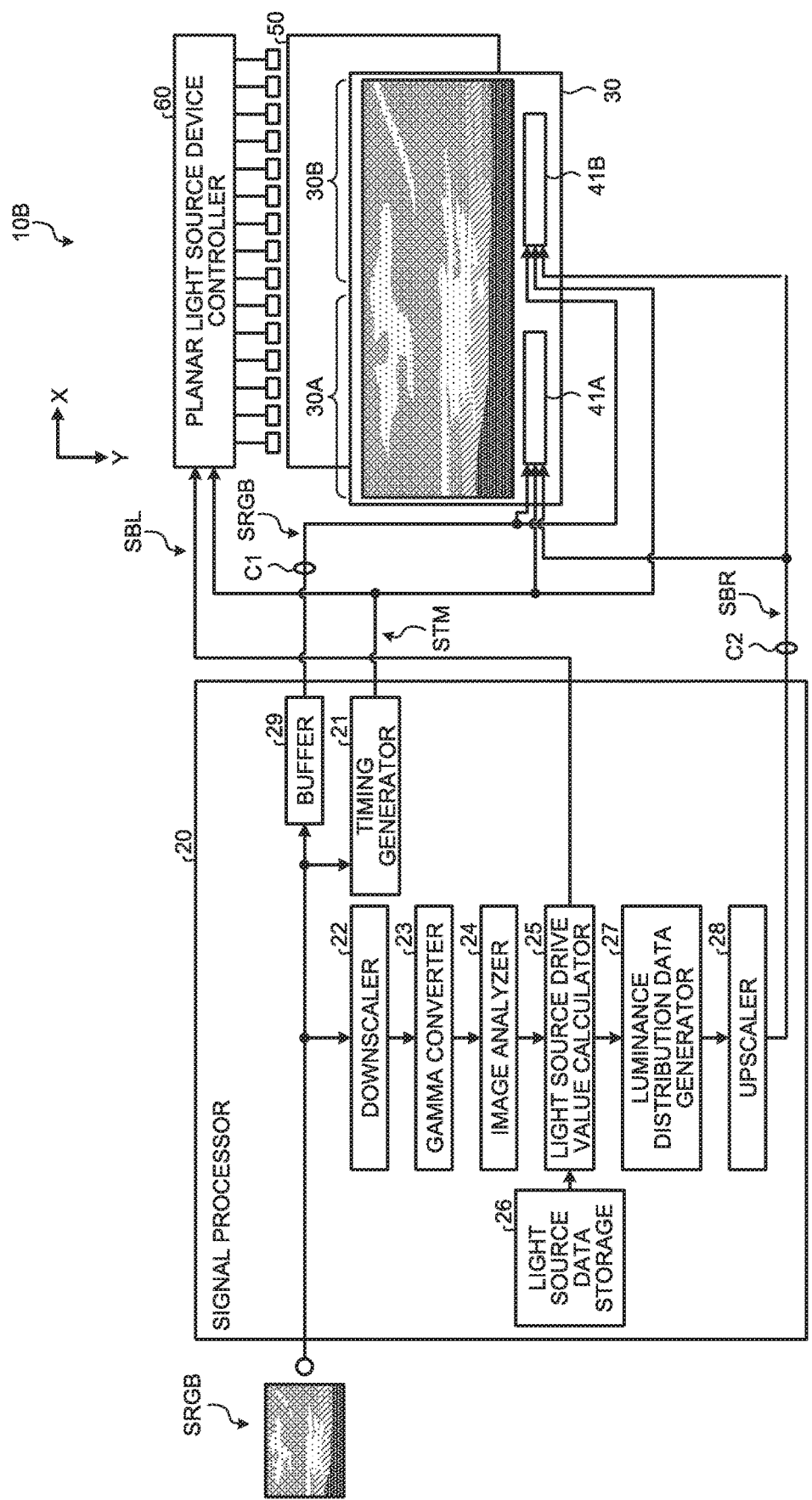
FIG. 16 is a schematic diagram of a display device according to a second modification of the embodiment.

FIG. 16 is a schematic diagram of a display device according to a second modification of the embodiment. According to a progress in high resolution in recent years, the image display panel 30 includes a very large number of the pixels 48 in some cases. In such cases, the image display panel 30 includes a plurality of signal output circuits. In the second modification illustrated in FIG. 16, the image display panel 30 of this display device 10B includes two signal output circuits 41A and 41B. The signal output circuits 41A and 41B correspond to an example of the first controller of the present disclosure. The number of signal output circuits included in the image display panel 30 is not limited to two, but may be three or larger.

The signal output circuit 41A takes charge of the image display in a region 30A, the region 30A being one part of the image display panel 30 (such as the left half of the image display panel 30). The signal output circuit 41B takes charge of the image display in a region 30B, the region 30B being the other part of the image display panel 30 (such as the right half of the image display panel 30). Each of the signal output circuits 41A and 41B includes the gamma converter 43, the upscaler 44, the image processor 45, and the inverse gamma converter 46 (refer to FIG. 6).

The buffer 29 transmits one part (such as the left-half part) of the input image signal SRGB to the signal output circuit 41A, and transmits the other part (such as the right-half part) of the input image signal SRGB to the signal output circuit 41B.

The upscaler 28 transmits one part (such as the left-half part) of the second luminance distribution data SBR to the signal output circuit 41A, and transmits the other part (such as the right-half part) of the second luminance distribution data SBR to the signal output circuit 41B.

Based on the data upscaled from one part (left-half part) of the second luminance distribution data SBR, the signal output circuit 41A outputs an output image signal based on the input image signal of one part (left-half part) of the input image signal SRGB to the region 30A (left-half) of the image display panel 30. Based on the data upscaled from the other part (right-half part) of the second luminance distribution data SBR, the signal output circuit 41B outputs an output image signal based on the input image signal of the other part (right-half part) of the input image signal SRGB to the region 30B (right-half) of the image display panel 30.

The following discusses a hypothetical case where the second luminance distribution data SBR is generated by the signal output circuits 41A and 41B instead of being generated by the signal processor 20. In this case, to generate the second luminance distribution data SBR, the signal output circuits 41A and 41B need to cooperate while performing data transmission and reception with each other. However, to cooperate with each other, the signal output circuits 41A and 41B are subjected to more complicate control, become more complicated in circuit configuration, and become larger in circuit scale. In addition, the image display panel 30 is difficult to be provided with wiring for the data transmission and reception between the signal output circuits 41A and 41B.

In contrast, in the display device 10B, the signal processor 20 generates the second luminance distribution data SBR, and transmits one part (left-half part) of the second luminance distribution data SBR to the signal output circuit 41A and the other part (right-half part) of the second luminance distribution data SBR to the signal output circuit 41B. Accordingly, the signal output circuit 41A only needs to upscale one part (left-half part) of the second luminance distribution data SBR. In the same manner, the signal output circuit 41B only needs to upscale the other part (right-half part) of the second luminance distribution data SBR. That is, the signal output circuits 41A and 41B need not cooperate and need not perform the data transmission and reception with each other. As a result, the control for the cooperation between the signal output circuits 41A and 41B is not needed. Thus, the signal output circuits 41A and 41B only need to operate based on a timing signal supplied from the timing generator 21. As a result, the signal output circuits 41A and 41B can be kept from becoming more complicated in circuit configuration, and kept from becoming larger in circuit scale. In addition, the image display panel 30 need not be provided with the wiring for the data transmission and reception between the signal output circuits 41A and 41B.

The second modification can be combined with the first modification. That is, in FIG. 16, the buffer 29 in the signal processor 20 can be eliminated. In this case, the operation timing of the display device 10B is the same as that of FIG. 15. The signal output circuits 41A and 41B can output the output image signal SRGBW based on the input image signal SRGB of the present time to the image display panel 30, based on the second luminance distribution data SBR of the frame two frames before the present frame.

6. Third Modification

Figure 17:
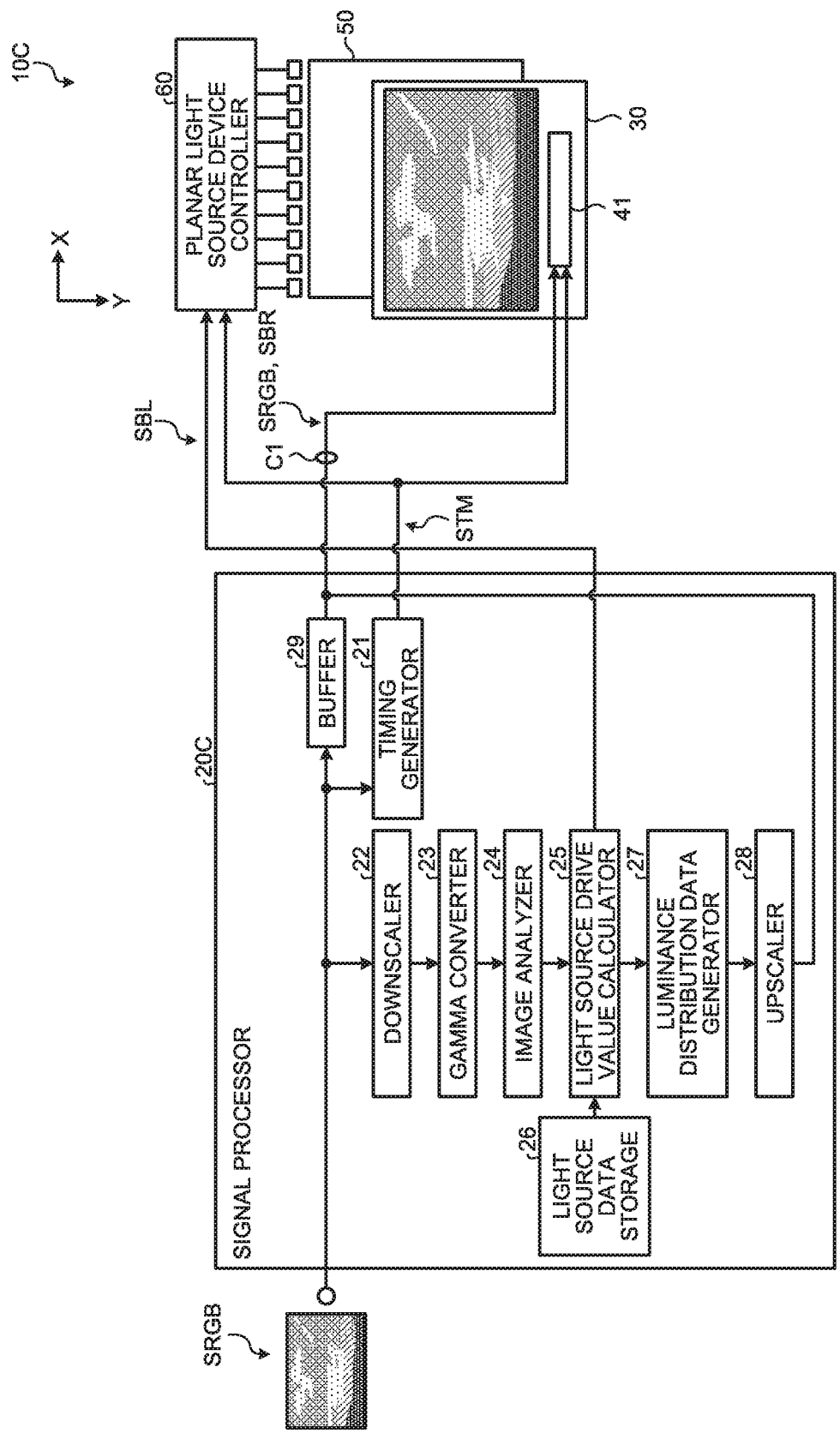
FIG. 17 is a schematic diagram of a display device according to a third modification of the embodiment.

FIG. 17 is a schematic diagram of a display device according to a third modification of the embodiment. A signal processor 20C of this display device 100 transmits the input image signal SRGB and the second luminance distribution data SBR to the signal output circuit 41 through one communication path C1.

Assuming that the number of elements (pixels) of the input image signal SRGB is 3840×2160, and the number of elements of the second luminance distribution data SBR is 320×180, the ratio between the numbers of elements is calculated as (320×180)/(3840×2160)=0.69%. Accordingly, when a vertical blanking interval and a horizontal blanking interval of roughly 1% each are provided for the display device 10C, the signal processor 20C can transmit the input image signal SRGB and the second luminance distribution data SBR to the signal output circuit 41 through one communication path C1.

Figure 18:
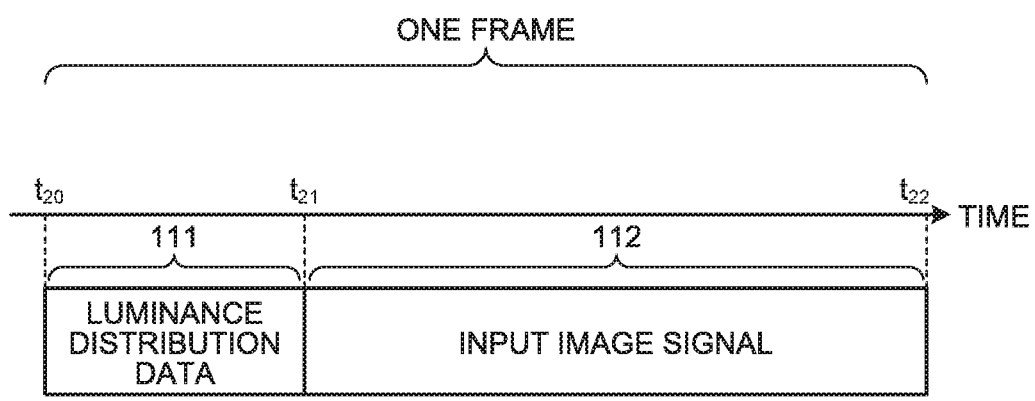
FIG. 18 is a diagram illustrating an exemplary communication format of the display device according to the third modification of the embodiment.

FIG. 18 is a diagram illustrating an exemplary communication format of the display device according to the third modification of the embodiment. The signal processor 20C collectively transmits second luminance distribution data 111 of one frame to the signal output circuit 41 during a period from time $t_{20}$ to time $t_{21}$.

Once receiving the second luminance distribution data 111 of one frame, the signal output circuit 41 can upscale the second luminance distribution data 111 of one frame.

The signal processor 20C collectively transmits an input image signal 112 of one frame to the signal output circuit 41 during a period from time $t_{21}$ to time $t_{22}$.

Since the communication format illustrated in FIG. 18 is employed, once receiving the input image signal 112 of one frame, the signal output circuit 41 can output the output image signal SRGBW based on the input image signal 112 to the image display panel 30, based on the data upscaled from the second luminance distribution data 111 of one frame.

Figure 19:
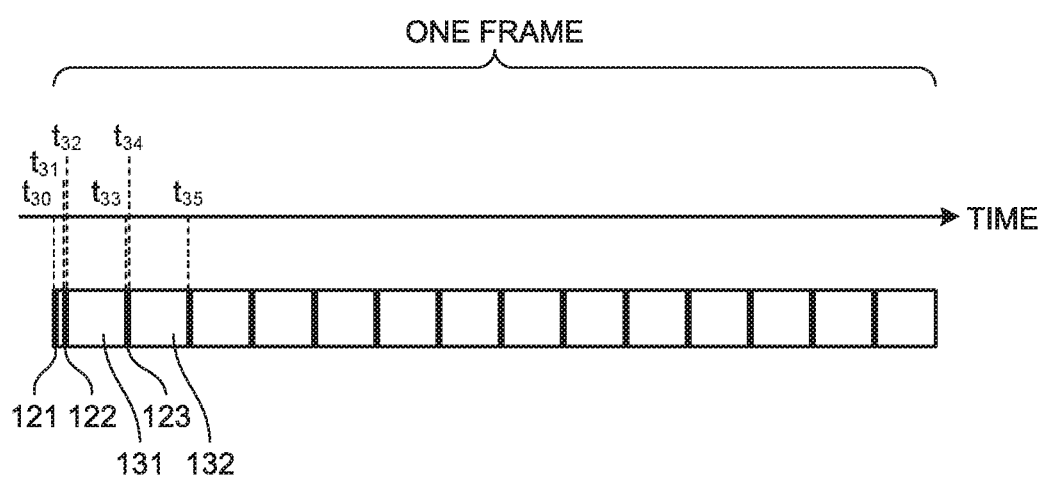
FIG. 19 is a diagram illustrating another exemplary communication format of the display device according to the third modification of the embodiment.

FIG. 19 is a diagram illustrating another exemplary communication format of the display device according to the third modification of the embodiment. At time $t_{30}$, the signal processor 20C transmits, to the signal output circuit 41, data 121 of the first row in the second luminance distribution data SBR having M rows and N columns. At time $t_{31}$, the signal processor 20C transmits, to the signal output circuit 41, data 122 of the second row in the second luminance distribution data SBR having M rows and N columns.

Once receiving the data 122 at time $t_{31}$, the signal output circuit 41 can apply the linear interpolation to the data 121 and 122. That is, the signal output circuit 41 can perform upscaling on the data 121 and 122. After performing upscaling on the data 121 and 122, the signal output circuit 41 can discard the data 121 while keeping only the data 122.

During a period from time $t_{32}$ to time $t_{33}$, the signal processor 20C transmits an input image signal 131 of some rows in the input image signal SRGB having $P_0$ rows and $Q_0$ columns to the signal output circuit 41. The number of rows of the input image signal 131 is a number adjustable by the data obtained by upscaling the data 121 and 122. For example, when the input image signal SRGB has 2160 rows, and the second luminance distribution data SBR has 180 rows, the number of rows of the input image signal 131 is 2160/180=12 rows. That is, during the period from time $t_{32}$ to time $t_{33}$, the signal processor 20C transmits the input image signal 131 of the first to twelfth rows in the input image signal SRGB to the signal output circuit 41.

Figure 20:
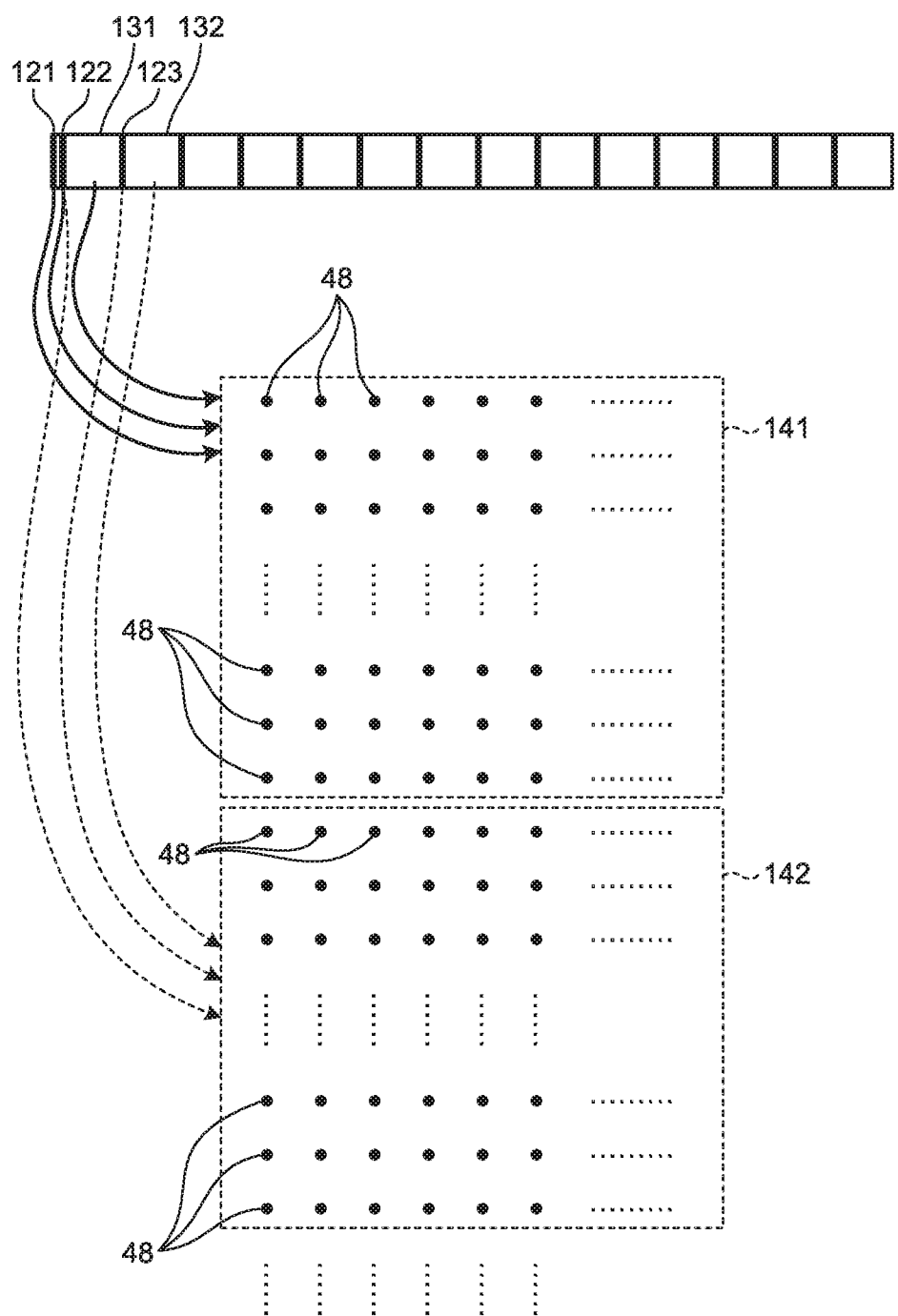
FIG. 20 is a diagram illustrating a correspondence relation of pixels to luminance distribution data and input image signals.

FIG. 20 is a diagram illustrating a correspondence relation of the pixels to luminance distribution data and input image signals. As illustrated in FIG. 20, pieces of data 121, 122, 123, . . . are the luminance distribution data at locations indicated by points 48 spaced at predetermined intervals. The signal output circuit 41 receives the data 121 of the first row at time $t_{30}$, and subsequently receives the data 122 of the second row at time $t_{31}$. The signal output circuit 41 then receives the input image signal 131 between the first row and the second row. By employing such a data format, the signal output circuit 41 performs the interpolation processing (upscaling) using the data 121 and 122 while receiving the input image signal 131. As a result, the signal output circuit 41 can generate the third luminance distribution of a region of the planar light source device 50 corresponding to the input image signal 131.

Once receiving the input image signal 131, the signal output circuit 41 can output an output image signal based on the input image signal 131 to a group 141 of the pixels 48 of the first to twelfth rows in the image display panel 30, based on the data obtained by upscaling the data 121 and 122, as illustrated in FIG. 20. After outputting the output image signal based on the input image signal 131 to the image display panel 30, the signal output circuit 41 can discard the data obtained by upscaling the data 121 and 122.

Referring again to FIG. 19, the signal processor 20C transmits the data 123 in the third row of the second luminance distribution data SBR having M rows and N columns to the signal output circuit 41 at time $t_{33}$.

Once receiving the data 123 at time $t_{33}$, the signal output circuit 41 can apply the linear interpolation to the data 122 and 123. That is, the signal output circuit 41 can perform upscaling on the data 122 and 123. After performing upscaling on the data 122 and 123, the signal output circuit 41 can discard the data 122 while keeping only the data 123.

During a period from time $t_{34}$ to time $t_{35}$, the signal processor 20C transmits, to the signal output circuit 41, an input image signal 132 of the 13th to 24th rows in the input image signal SRGB.

Once receiving the input image signal 132, the signal output circuit 41 can output an output image signal based on the data obtained by upscaling the data 122 and 123. To describe this in detail, the signal output circuit 41 can output the output image signal based on the input image signal 132 to a group 142 of the pixels 48 of the 13th to 24th rows in the image display panel 30, as illustrated in FIG. 20. After outputting the output image signal based on the input image signal 132 to the image display panel 30, the signal output circuit 41 can discard the data obtained by upscaling the data 122 and 123.

From time $t_{35}$, the signal processor 20C repeats the same processing as that performed between the time $t_{33}$ and time $t_{35}$. To describe this in detail, the signal processor 20C repeats transmission TR1 and transmission TR2. The transmission TR1 is transmission of data of the Uth row (where U is an integer equal to or greater than four) of the second luminance distribution data SBR, and the transmission TR2 is transmission of a signal in the input image signal SRGB that is adjustable by data obtained by upscaling the Uth and (U−1)th rows of the second luminance distribution data SBR.

By employing the communication format illustrated in FIG. 19, the display device 100 can reduce the memory area used by the signal output circuit 41 to upscale the second luminance distribution data SBR.

7. Fourth Modification

Figure 21:
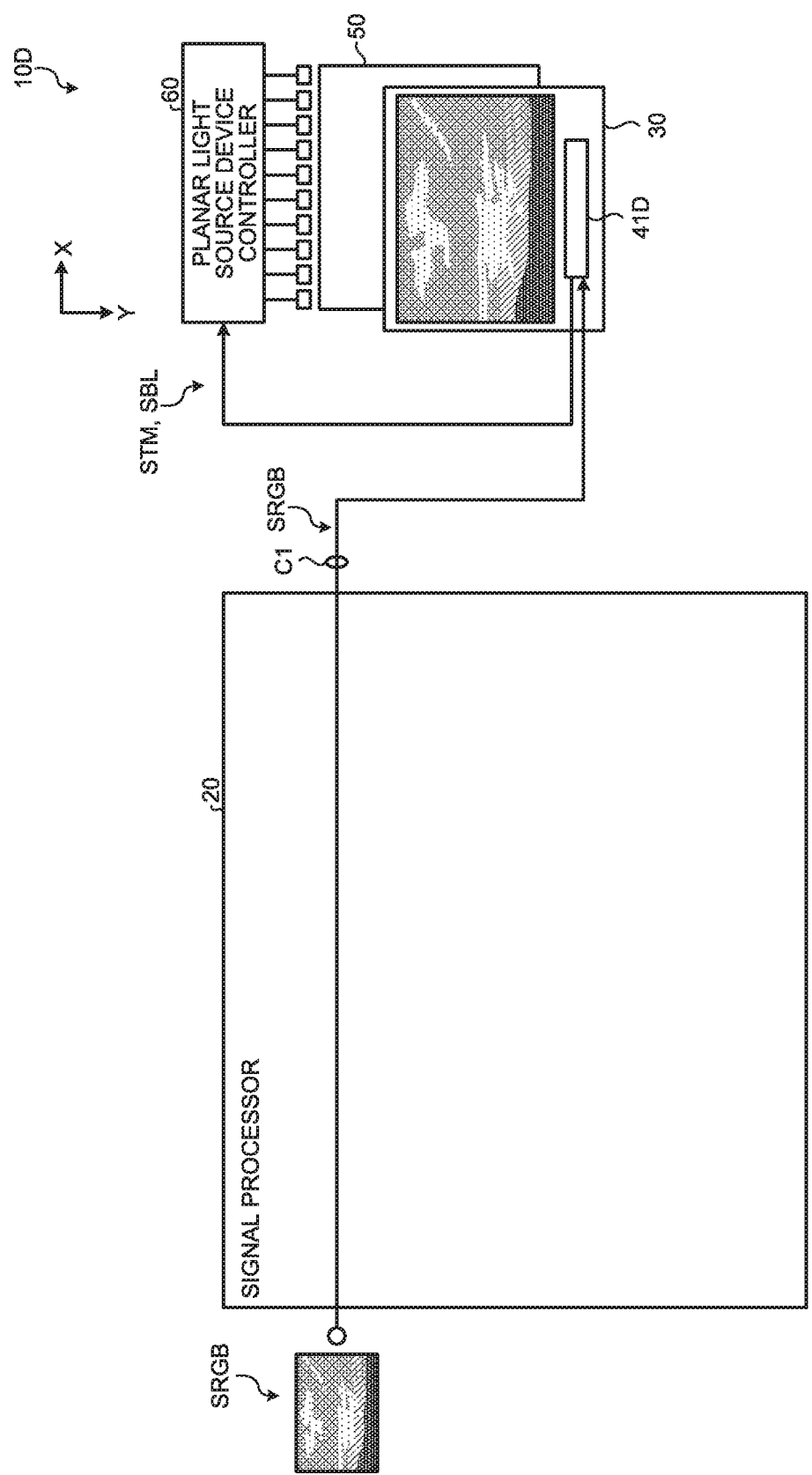
FIG. 21 is a schematic diagram of a display device according to a fourth modification of the embodiment.

FIG. 21 is a schematic diagram of a display device according to a fourth modification of the embodiment. In this display device 10D, the signal processor 20 directly outputs, to a signal output circuit 41D, the input image signal SRGB received from the image output module 11.

Figure 22:
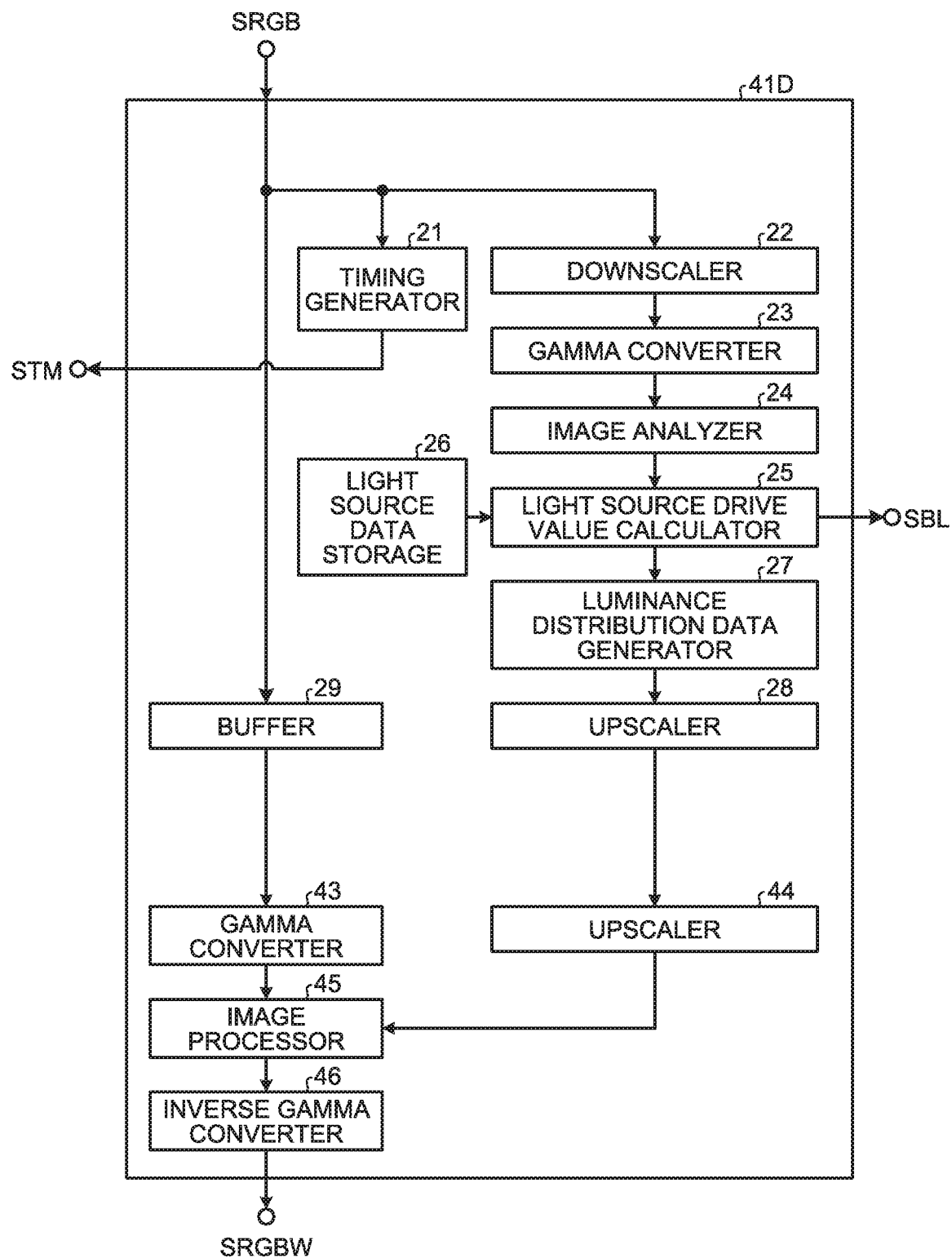
FIG. 22 is a block diagram for explaining a signal output circuit of the display device according to the fourth modification of the embodiment.

FIG. 22 is a block diagram for explaining this signal output circuit of the display device according to the fourth modification of the embodiment. The signal output circuit 41D includes the timing generator 21, the downscaler 22, the gamma converter 23, the image analyzer 24, the light source drive value calculator 25, the light source data storage 26, the luminance distribution data generator 27, the upscaler 28, the buffer 29, the gamma converter 43, the upscaler 44, the image processor 45, and the inverse gamma converter 46.

The timing generator 21 of the signal output circuit 41D outputs the synchronizing signal STM to the planar light source device controller 60. The light source drive value calculator 25 of the signal output circuit 41D outputs the planar light source device control signal SBL to the planar light source device controller 60.

The following discusses a hypothetical case where the signal output circuit 41D generates the third luminance distribution data SB having the number of elements of $P_0 \times Q_0$ by upscaling the first luminance distribution data DSBR having the number of elements of K×L by the linear interpolation. In this case, the signal output circuit 41D is difficult to generate the third luminance distribution data SB having the number of elements of $P_0 \times Q_0$ (3840×2160) with required accuracy by upscaling the first luminance distribution data DSBR having the number of elements of K×L (21×10) by the linear interpolation.

The following discusses another hypothetical case where the signal output circuit 41D generates the third luminance distribution data SB having the number of elements of $P_0 \times Q_0$ by upscaling the first luminance distribution data DSBR having the number of elements of K×L by the polynomial interpolation. In this case, the signal output circuit 41D generates the third luminance distribution data SB having the number of elements of $P_0 \times Q_0$ (3840×2160) by upscaling the first luminance distribution data DSBR having the number of elements of K×L (21×10) by the polynomial interpolation. This approach causes a larger calculation load and a larger circuit scale of the signal output circuit 41D.

In contrast, with the signal output circuit 41D of the display device 10D according to the fourth modification, the upscaler 28 generates the second luminance distribution data SBR having the number of elements of M×N by upscaling the first luminance distribution data DSBR having the number of elements of K×L by the linear interpolation. In addition, the upscaler 44 generates the third luminance distribution data SB having the number of elements of $P_0 \times Q_0$ by upscaling the second luminance distribution data SBR having the number of elements of M×N by the polynomial interpolation. As a result, the display device 10D can reduce the circuit scale.

The fourth modification can be combined with the first modification. That is, in FIG. 22, the buffer 29 in the signal output circuit 41D can be eliminated. In this case, the operation timing of the display device 10D is the same as that of FIG. 15. The signal output circuit 41D can output the output image signal SRGBW based on the input image signal SRGB of the present time to the image display panel 30, based on the second luminance distribution data SBR of the frame two frames before the present frame.

While the preferred embodiment of the present disclosure has been described above, the present disclosure is not limited to the embodiment described above. The content disclosed in the embodiment is merely an example, and can be variously modified within the scope not departing from the gist of the present disclosure. Any modifications appropriately made within the scope not departing from the gist of the present disclosure naturally belong to the technical scope of the present disclosure.

What is claimed is:

1. A display device comprising:
an image display panel comprising a plurality of pixels;
an illuminator configured to illuminate the image display panel from a back side thereof;
a first controller configured to output an output image signal having the same resolution as that of the pixels to the image display panel;
a second controller configured to
transmit an input image signal to the first controller,
generate, according to luminance distribution information on the input image signal, second luminance distribution data divided into regions at a second planar density lower than a first planar density equal to the resolution, and
transmit the second luminance distribution data to the first controller,
wherein the second controller is configured to
generate first luminance distribution data divided into regions at a third planar density lower than the second planar density according to the luminance distribution information,
control the illuminator based on the first luminance distribution data, and
generate the second luminance distribution data by applying a polynomial interpolation to the first luminance distribution data to transmit the second luminance distribution data to the first controller,
wherein the first controller is configured to
generate third luminance distribution data having the resolution by applying a linear interpolation to the second luminance distribution data, and
generate the output image signal by adjusting the input image signal based on the third luminance distribution data,
wherein the first controller comprises a plurality of integrated circuits each configured to take charge of a corresponding one of a plurality of regions of the image display panel,
wherein the second controller is configured to
transmit signals in the input image signal corresponding to the regions to the respective integrated circuits, and
transmit pieces of data in the second luminance distribution data corresponding to the regions to the respective integrated circuits, and
wherein each of the integrated circuits is configured to
generate data in the third luminance distribution data corresponding to a region taken charge of by the integrated circuit by applying the linear interpolation to data in the second luminance distribution data corresponding to the region taken charge of by the integrated circuit, and
generate a signal in the output image signal corresponding to the region taken charge of by the integrated circuit by adjusting a signal in the input image signal corresponding to the region taken charge of by the integrated circuit based on the data in the third luminance distribution data corresponding to the region taken charge of by the integrated circuit.

2. The display device according to claim 1,
wherein the illuminator comprises:
a plurality of light sources; and
a light guide plate configured to guide light emitted from the light sources to the image display panel, and
wherein the second controller stores therein look-up tables each containing information on a light intensity distribution of light that is emitted from a corresponding one of the light sources and irradiates the image display panel, and is configured to control lighting amounts of the light sources based on the input image signal and the look-up tables.

3. The display device according to claim 2,
wherein the second controller is configured to control the lighting amounts of the light sources based on the look-up tables and an image signal having a reduced number of elements obtained by thinning of the input image signal.

4. The display device according to claim 3,
wherein the number of elements of the image signal is greater than the number of elements of the first luminance distribution data.

5. The display device according to claim 2,
wherein the second controller is configured to control the lighting amounts of the light sources based on the look-up tables and an image signal having a reduced number of elemets obtained by extracting representative values of respective regions obtained by dividing the input image signal.

6. The display device according to claim 5,
wherein the number of elements of the image signal is greater than the number of elements of the first luminance distribution data.

7. The display device according to claim 2,
wherein the light sources are arranged at locations opposed to a side surface of the light guide plate, and are configured to emit the light to the side surface of the light guide plate.

8. The display device according to claim 7,
wherein the number of elements of the first luminance distribution data is equal to the number of elements of each of the look-up tables.

9. The display device according to claim 8,
wherein the number of elements of the first luminance distribution data in an arrangement direction of the light sources is equal to a number obtained by adding one to twice the number of the light sources.

10. The display device according to claim 2,
wherein the light sources are arranged in a two-dimensional matrix on a back side of the light guide plate, and are configured to emit the light to the back side of the light guide plate.

11. The display device according to claim 1,
wherein the second controller is configured to generate the second luminance distribution data by applying a polynomial interpolation to the first luminance distribution data.

12. A display device comprising:
an image display panel comprising a plurality of pixels;
an illuminator configured to illuminate the image display panel from a back side thereof;
a first controller configured to output an output image signal having the same resolution as that of the pixels to the image display panel;
a second controller configured to
transmit an input image signal to the first controller,
generate, according to luminance distribution information on the input image signal, second luminance distribution data divided into regions at a second planar density lower than a first planar density equal to the resolution, and
transmit the second luminance distribution data to the first controller, wherein the second controller is configured to
generate first luminance distribution data divided into regions at a third planar density lower than the second planar density according to the luminance distribution information,
control the illuminator based on the first luminance distribution data, and generate the second luminance distribution data by applying a polynomial interpolation to the first luminance distribution data to transmit the second luminance distribution data to the first controller, and
wherein the first controller is configured to
generate third luminance distribution data having the resolution by applying a linear interpolation to the second luminance distribution data, and
generate the output image signal by adjusting the input image signal based on the third luminance distribution data,
wherein the second controller is configured to
transmit a first row and a second row of the second luminance distribution data to the first controller,
transmit a signal in the input image signal adjusted by the first row and the second row to the first controller after transmitting the first and second rows, and
repeat thereafter transmission of data of a Vth row of the second luminance distribution data to the first controller and transmission of a signal in the input image signal that is adjusted by the Vth row and a row immediately preceding the Vth row to the first controller, where V is an integer equal to or greater than three.

13. The display device according to claim 12, wherein the illuminator comprises:
a plurality of light sources; and
a light guide plate configured to guide light emitted from the light sources to the image display panel, and
wherein the second controller stores therein look-up tables each containing information on a light intensity distribution of light that is emitted from a corresponding one of the light sources and irradiates the image display panel, and is configured to control lighting amounts of the light sources based on the input image signal and the look-up tables.

14. The display device according to claim 13,
wherein the second controller is configured to control the lighting amounts of the light sources based on the look-up tables and an image signal having a reduced number of elements obtained by thinning the input image signal.

15. The display device according to claim 14,
wherein the number of elements of the image signal is greater than the number of elements of the first luminance distribution data.

16. The display device according to claim 13,
wherein the second controller is configured to control the lighting amounts of the light sources based on the look-up tables and an image signal having a reduced number of elements obtained by extracting representative values of respective regions obtained by dividing the input image signal.

17. The display device according to claim 16,
wherein the number of elements of the image signal is greater than the number of elements of the first luminance distribution data.

18. The display device according to claim 13,
wherein the light sources are arranged at locations opposed to a side surface of the light guide plate, and are configured to emit the light to the side surface of the light guide plate.

19. The display device according to claim 18,
wherein the number of elements of the first luminance distribution data is equal to the number of elements of each of the look-up tables.

20. The display device according to claim 19,
wherein the number of elements of the first luminance distribution data in an arrangement direction of the light sources is equal to a number obtained by adding one to twice the number of the light sources.

21. The display device according to claim 13,
wherein the light sources are arranged in a two-dimensional matrix on a back side of the light guide plate, and are configured to emit the light to the back side of the light guide plate.

22. The display device according to claim 13,
wherein the first controller comprises a plurality of integrated circuits each configured to take charge of a corresponding one of a plurality of regions of the image display panel,
wherein the second controller is configured to
transmit signals in the input image signal corresponding to the regions to the respective integrated circuits, and
transmit pieces of data in the second luminance distribution data corresponding to the regions to the respective integrated circuits, and
wherein each of the integrated circuits is configured to
generate data in the third luminance distribution data corresponding to a region taken charge of by the integrated circuit by applying the linear interpolation to data in the second luminance distribution data corresponding to the region taken charge of by the integrated circuit, and
generate a signal in the output image signal corresponding to the region taken charge of by the integrated circuit by adjusting a signal in the input image signal corresponding to the region taken charge of by the integrated circuit based on the data in the third luminance distribution data corresponding to the region taken charge of by the integrated circuit.

23. The display device according to claim 12,
wherein the second controller is configured to generate the second luminance distribution data by applying a polynomial interpolation to the first luminance distribution data.

* * * * *